United States Patent
Jin et al.

(10) Patent No.: US 12,126,702 B2
(45) Date of Patent: Oct. 22, 2024

(54) DATA PROCESSING METHOD AND APPARATUS, AND TERMINAL

(71) Applicant: Huawei Technologies Co., Ltd., Shenzhen (CN)

(72) Inventors: Hui Jin, Beijing (CN); Chaofeng Lian, Shenzhen (CN); Yun Liu, Shenzhen (CN); Fenghui Dou, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 317 days.

(21) Appl. No.: 17/629,983

(22) PCT Filed: Jul. 15, 2020

(86) PCT No.: PCT/CN2020/102175
§ 371 (c)(1),
(2) Date: Jan. 25, 2022

(87) PCT Pub. No.: WO2021/017832
PCT Pub. Date: Feb. 4, 2021

(65) Prior Publication Data
US 2022/0263927 A1    Aug. 18, 2022

(30) Foreign Application Priority Data
Jul. 26, 2019    (CN) .......................... 201910683880.X

(51) Int. Cl.
*H04L 69/16*    (2022.01)
*H04L 69/163*    (2022.01)
*H04W 28/06*    (2009.01)

(52) U.S. Cl.
CPC .......... *H04L 69/161* (2013.01); *H04L 69/163* (2013.01); *H04W 28/06* (2013.01)

(58) Field of Classification Search
CPC ..... H04L 69/161; H04L 69/163; H04L 69/08; H04L 69/168; H04L 69/169; H04L 69/28;
(Continued)

(56) References Cited

U.S. PATENT DOCUMENTS

2006/0140121 A1* 6/2006 Kakani ............... H04L 47/2458
370/235
2008/0080464 A1* 4/2008 Speight ................. H04L 1/1854
370/342
(Continued)

FOREIGN PATENT DOCUMENTS

CN    101753277 A    6/2010
CN    102833783 A    12/2012
(Continued)

OTHER PUBLICATIONS

Huawei (Rapporteur) et al., "Summary of email discussion [82#13][Joint/MTCe] Evaluation of extended DRX cycles for UEPCOP", 3GPP TSG-RAN WG2 #83, R2-132893, Barcelona, Spain, Aug. 19-23, 2013, 23 pages.
(Continued)

*Primary Examiner* — Dady Chery
(74) *Attorney, Agent, or Firm* — Slater Matsil, LLP

(57) ABSTRACT

An application processor sends a TCP packet to the modem, where the TCP packet is used by the modem to generate a wireless protocol data packet corresponding to the TCP packet, so that the modem sends the wireless protocol data packet to a base station. The application processor receives first status information from the modem, where the first status information is status information of the wireless protocol data packet or status information of the TCP packet. The application processor determines, based on the first status information, whether the TCP packet is successfully sent to the base station. If the TCP packet is successfully sent to the base station, the application processor starts a retrans-
(Continued)

mission timer corresponding to the TCP packet. If the TCP packet is not successfully sent to the base station, the application processor sends the TCP packet to the modem again.

14 Claims, 18 Drawing Sheets

(58) Field of Classification Search
CPC ....... H04L 1/1874; H04L 1/1848; H04L 1/18; H04W 28/06
See application file for complete search history.

(56) References Cited

U.S. PATENT DOCUMENTS

| | | | |
|---|---|---|---|
| 2011/0013512 A1 | 1/2011 | Morandin | |
| 2014/0064095 A1* | 3/2014 | Li | H04L 47/32 370/236 |
| 2015/0215218 A1* | 7/2015 | Kanamarlapudi | H04L 47/2466 370/235 |
| 2018/0183549 A1 | 6/2018 | Cho et al. | |
| 2019/0268445 A1* | 8/2019 | Zhang | H04L 47/27 |
| 2020/0266955 A1* | 8/2020 | Agrawal | H04L 1/1825 |

FOREIGN PATENT DOCUMENTS

| | | |
|---|---|---|
| CN | 103650401 A | 3/2014 |
| CN | 104243090 A | 12/2014 |
| CN | 104780028 A | 7/2015 |
| CN | 105846968 A | 8/2016 |
| CN | 105873097 A | 8/2016 |
| CN | 106656431 A | 5/2017 |
| CN | 107040343 A | 8/2017 |
| CN | 107959554 A | 4/2018 |
| CN | 108667560 A | 10/2018 |
| CN | 109981385 A | 7/2019 |
| DE | 102016206944 A1 | 11/2016 |
| EP | 2605560 A1 | 6/2013 |
| EP | 2846470 A1 | 3/2015 |
| EP | 3522417 A1 | 8/2019 |
| WO | 2010054388 A2 | 5/2010 |
| WO | 2016161636 A1 | 10/2016 |

OTHER PUBLICATIONS

Yun, L. et al., "An Improved TCP Congestion Control Algorithm Over Mixed Wired/2ireless Networks", Proceedings of IC-BNMT 2009, Oct. 18-20, 2009, 5 pages.
Intel Corporation, "Flow Control mechanism for UL", 3GPP TSG RAN WG2 Meeting #106, R2-1906354, Reno, NV, US, May 13-17, 2019, 4 pages.

* cited by examiner

DATA PROCESSING METHOD AND APPARATUS, AND TERMINAL

CROSS-REFERENCE TO RELATED APPLICATIONS

This application is a national stage of International Application No. PCT/CN2020/102175, filed on Jul. 15, 2020, which claims priority to Chinese Patent Application No. 201910683880.X, filed on Jul. 26, 2019. Both of the aforementioned applications are hereby incorporated by reference in their entireties.

TECHNICAL FIELD

This application relates to the field of wireless communications technologies, and in particular, to a data processing method and apparatus, and a terminal.

BACKGROUND

Compared with a wired network, a wireless network is more complex and prone to congestion. Temporary errors on the wireless network, mobility factors, and air interface retransmission may cause congestion. The temporary errors include signal jitter, link disconnection, and the like. The mobility factors include a handover delay, handover identification, and the like. The air interface retransmission includes radio link control (radio link control, RLC) layer retransmission, media access control (media access control, MAC)/(physical, PHY) layer retransmission, and the like.

A transmission control protocol (transmission control protocol, TCP) is a connection-oriented end-to-end reliable protocol. One of the most important mechanisms in TCP reliability is data timeout processing and retransmission. Specifically, the TCP protocol requires that each time a transmit end sends a packet segment, the transmit end starts a retransmission timer and waits for an acknowledgement. After successfully receiving new data, a receive end returns the acknowledgement (Acknowledgement, ACK). If no acknowledgement for the packet segment is received before the retransmission timer expires, the transmit end considers that data in the packet segment is lost or damaged, and needs to retransmit the data in the packet segment.

In a scenario of wirelessly transmitting data, the TCP protocol is unaware of a wireless protocol connection status of the TCP protocol, and can only determine, based on whether an ACK is received, whether a data packet is successfully sent. Consequently, when the wireless network is congested, the lack of cooperation between a TCP layer and a bottom layer of the TCP layer further aggravates the congestion.

SUMMARY

Embodiments of this application provide a data processing method and apparatus, and a terminal. An application processor and a modem may cooperate with each other to send a TCP packet. This improves TCP packet sending efficiency.

According to a first aspect, an embodiment of this application provides a data processing method. The method is applied to a terminal. The terminal includes an application processor and a modem. The method includes: The application processor sends a TCP packet to the modem, where the TCP packet is used by the modem to generate a wireless protocol data packet corresponding to the TCP packet, so that the modem sends the wireless protocol data packet to a base station. The application processor receives first status information from the modem, where the first status information is status information of the wireless protocol data packet or status information of the TCP packet. The application processor determines, based on the first status information, whether the TCP packet is successfully sent to the base station. If the TCP packet is successfully sent to the base station, the application processor starts a retransmission timer corresponding to the TCP packet. If the TCP packet is not successfully sent to the base station, the application processor sends the TCP packet to the modem again.

It should be noted that an action performed by the application processor after the TCP packet is successfully sent to the base station or is not successfully sent to the base station is not specifically limited in this embodiment of this application. In this embodiment of this application, the terminal starts the retransmission timer corresponding to the TCP packet when the TCP packet is successfully sent to the base station, and it is not limited or required that the terminal necessarily sends the TCP packet to the modem again when the TCP packet is not successfully sent to the base station. The terminal sends the TCP packet to the modem again when the TCP packet is not successfully sent to the base station, and it is not limited or required that the terminal necessarily starts the retransmission timer corresponding to the TCP packet when the TCP packet is successfully sent to the base station.

In other words, in some embodiments, for any TCP packet, when the TCP packet is successfully sent to the base station, a manner in which the application processor processes the TCP packet is: starting a retransmission timer corresponding to the TCP packet. When the TCP packet is not successfully sent to the base station, a manner in which the application processor processes the TCP packet is not limited in this embodiment.

In some embodiments, for any TCP packet, when the TCP packet is not successfully sent to the base station, a manner in which the application processor processes the TCP packet is: sending the TCP packet to the modem again. When the TCP packet is successfully sent to the base station, a manner in which the application processor processes the TCP packet is not limited in this embodiment.

In a possible implementation, the status information of the TCP packet includes first characteristic information. That the application processor determines, based on the first status information, whether the TCP packet is successfully sent to the base station includes: The application processor determines, based on the first characteristic information, a TCP packet corresponding to the first status information.

In this implementation, the first status information includes the first characteristic information, so that the application processor can determine, based on the first characteristic information, the TCP packet corresponding to the first status information, and can further perform corresponding processing on the TCP packet.

In a possible implementation, the application processor includes a TCP module and an IP module. That the application processor sends a TCP packet to the modem includes: The IP module receives an identifier of the TCP packet from the TCP module, so as to establish a first correspondence between the identifier of the TCP packet and an identifier of an IP data packet corresponding to the TCP packet; and the IP module sends the IP data packet to the modem, so that the modem obtains the identifier of the IP data packet from the IP data packet, and establishes a second correspondence between the identifier of the IP data packet and an identifier of the wireless protocol data packet. The first correspondence and the second correspondence are used to indicate a correspondence between the TCP packet and the wireless protocol data packet.

In this implementation, the correspondence between the identifier of the TCP packet and the identifier of the IP data packet is established, and the correspondence between the identifier of the IP data packet and the identifier of the wireless protocol data packet is established, so that the correspondence between the TCP packet and the wireless protocol data packet can be obtained based on the two correspondences.

In a possible implementation, the method further includes: The IP module sends the first correspondence to the TCP module. The first correspondence is used by the TCP module to determine, based on the first characteristic information, the TCP packet corresponding to the first status information, and the first characteristic information is the identifier of the IP data packet that is determined by the modem based on the second correspondence and the identifier of the wireless protocol data packet.

In this implementation, the TCP module may store the correspondence between the identifier of the TCP packet and the identifier of the IP data packet, and the modem stores the correspondence between the identifier of the IP data packet and the identifier of the wireless protocol data packet. The modem may determine the identifier of the IP data packet based on the identifier of the wireless protocol data packet and the correspondence between the identifier of the IP data packet and the identifier of the wireless protocol data packet, and use the identifier of the IP data packet as the first characteristic information, so that the TCP module can determine, based on the IP data packet and the correspondence between the identifier of the TCP packet and the identifier of the IP data packet, the TCP packet corresponding to the first status information.

In a possible implementation, the method further includes: The IP module receives the second correspondence from the modem; the IP module establishes a third correspondence between the identifier of the TCP packet and the identifier of the wireless protocol data packet based on the first correspondence and the second correspondence; and the IP module sends the third correspondence to the TCP module. The third correspondence is used by the TCP module to determine, based on the first characteristic information, the TCP packet corresponding to the first status information, and the first characteristic information is the identifier of the wireless protocol data packet.

In this implementation, the correspondence between the identifier of the TCP packet and the identifier of the wireless protocol data packet may be established based on the correspondence between the identifier of the TCP packet and the identifier of the IP data packet and the correspondence between the identifier of the IP data packet and the identifier of the wireless protocol data packet. The TCP module may store the correspondence between the identifier of the TCP packet and the identifier of the wireless protocol data packet, so as to determine, based on the identifier of the wireless protocol data packet in the first status information, the TCP packet corresponding to the first status information.

In a possible implementation, the application processor includes a TCP module and an IP module. That the application processor sends a TCP packet to the modem includes: The IP module receives the TCP packet and an identifier of the TCP packet from the TCP module; and the IP module sends an IP data packet corresponding to the TCP packet and the identifier of the TCP packet to the modem, so that the modem establishes a third correspondence between the identifier of the TCP packet and an identifier of the wireless protocol data packet, and sends the third correspondence to the TCP module. The third correspondence is used by the TCP module to determine, based on the first characteristic information, the TCP packet corresponding to the first status information, and the first characteristic information is the identifier of the wireless protocol data packet.

In this implementation, the modem may obtain the identifier of the TCP packet, then establish the correspondence between the identifier of the TCP packet and the identifier of the wireless protocol data packet, and send the correspondence to the TCP module, so that the TCP module can determine, based on the identifier of the wireless protocol data packet in the first status information, the TCP packet corresponding to the first status information.

In a possible implementation, the application processor includes a TCP module and an IP module. That the application processor sends a TCP packet to the modem includes: The IP module receives the TCP packet and an identifier of the TCP packet from the TCP module; and the IP module sends an IP data packet corresponding to the TCP packet and the identifier of the TCP packet to the modem, so that the modem establishes a third correspondence between the identifier of the TCP packet and an identifier of the wireless protocol data packet. The third correspondence is used by the modem to determine the identifier of the TCP packet based on the identifier of the wireless protocol data packet and use the identifier of the TCP packet as the first characteristic information.

In this implementation, the modem may obtain the identifier of the TCP packet, and then establish the correspondence between the identifier of the TCP packet and the identifier of the wireless protocol data packet. Therefore, when any wireless protocol data packet is successfully sent to the base station or is not successfully sent to the base station, the identifier of the TCP packet may be determined based on the identifier of the wireless protocol data packet, and may be added to the first status information as the first characteristic information, so that the TCP packet can determine, based on the identifier of the TCP packet, the TCP packet corresponding to the first status information.

In a possible implementation, that the TCP packet is not successfully sent to the base station is specifically: The wireless protocol data packet has been transmitted by the modem through an air interface, and when a discard timer corresponding to the wireless protocol data packet expires, the modem does not receive an ACK corresponding to the wireless protocol data packet from the base station; or when a discard timer corresponding to the wireless protocol data packet expires, the wireless protocol data packet is still not transmitted by the modem through an air interface.

In this implementation, for any wireless protocol data packet, when the wireless protocol data packet has been transmitted through the air interface, and when a discard timer corresponding to the wireless protocol data packet expires, the modem does not receive an ACK corresponding to the wireless protocol data packet from the base station, and it may be considered that a TCP packet corresponding to the wireless protocol data packet does not arrive at the base station; or when a discard timer corresponding to the wireless protocol data packet expires, the wireless protocol data packet is still not transmitted by the modem through the air interface, and it may be considered that a TCP packet corresponding to the wireless protocol data packet is not successfully sent to the base station.

In a possible implementation, the modem includes a packet data convergence protocol PDCP module, the PDCP module includes a priority send queue and a normal send queue, and a sending priority of a PDCP data packet in the priority send queue is higher than that of a PDCP data packet in the normal send queue. That the application processor sends the TCP packet to the modem again includes: The application processor sends a to-be-retransmitted packet and a retransmission indication of the TCP packet to the modem. The retransmission indication is used by the modem to add a PDCP data packet corresponding to the to-be-retransmitted packet to the priority send queue.

In this implementation, PDCP data of a packet may be preferentially retransmitted, so as to prevent or alleviate a problem that congestion at a wireless protocol layer is aggravated by a mechanism such as a fast retransmission mechanism.

In a possible implementation, that the application processor receives first status information from the modem is specifically: The application processor receives the first status information from a wireless protocol module in the modem. The wireless protocol module is one or any combination of the following:
a PDCP module, a radio link control RLC module, and a media access control MAC module.

In this implementation, different wireless protocol modules may be used to feed back the first status information to the application processor. This improves solution implementation flexibility.

According to a second aspect, an embodiment of this application provides a data processing apparatus. The apparatus includes an application processing unit and a modem unit. The application processing unit is configured to send a TCP packet to the modem unit, where the TCP packet is used by the modem unit to generate a wireless protocol data packet corresponding to the TCP packet, so that the modem unit sends the wireless protocol data packet to a base station. The application processing unit is further configured to receive first status information from the modem unit, where the first status information is status information of the wireless protocol data packet or status information of the TCP packet. The application processing unit is further configured to determine, based on the first status information, whether the TCP packet is successfully sent to the base station. If the TCP packet is successfully sent to the base station, the application processing unit is further configured to start a retransmission timer corresponding to the TCP packet. If the TCP packet is not successfully sent to the base station, the application processing unit is further configured to send the TCP packet to the modem unit again.

In a possible implementation, the status information of the TCP packet includes first characteristic information; and the application processing unit is further configured to determine, based on the first characteristic information, a TCP packet corresponding to the first status information.

In a possible implementation, the application processing unit includes a TCP subunit and an IP subunit. The IP subunit is configured to receive an identifier of the TCP packet from the TCP subunit, so as to establish a first correspondence between the identifier of the TCP packet and an identifier of an IP data packet corresponding to the TCP packet. The IP subunit is further configured to send the IP data packet to the modem unit, so that the modem unit obtains the identifier of the IP data packet from the IP data packet, and establishes a second correspondence between the identifier of the IP data packet and an identifier of the wireless protocol data packet. The first correspondence and the second correspondence are used to indicate a correspondence between the TCP packet and the wireless protocol data packet.

In a possible implementation, the IP subunit is further configured to send the first correspondence to the TCP subunit. The first correspondence is used by the TCP subunit to determine, based on the first characteristic information, the TCP packet corresponding to the first status information, and the first characteristic information is the identifier of the IP data packet that is determined by the modem unit based on the second correspondence and the identifier of the wireless protocol data packet.

In a possible implementation, the IP subunit is further configured to receive the second correspondence from the modem unit. The IP subunit is further configured to establish a third correspondence between the identifier of the TCP packet and the identifier of the wireless protocol data packet based on the first correspondence and the second correspondence. The IP subunit is further configured to send the third correspondence to the TCP subunit. The third correspondence is used by the TCP subunit to determine, based on the first characteristic information, the TCP packet corresponding to the first status information, and the first characteristic information is the identifier of the wireless protocol data packet.

In a possible implementation, the application processing unit includes a TCP subunit and an IP subunit. The IP subunit is further configured to receive the TCP packet and an identifier of the TCP packet from the TCP subunit. The IP subunit is further configured to send an IP data packet corresponding to the TCP packet and the identifier of the TCP packet to the modem unit, so that the modem unit establishes a third correspondence between the identifier of the TCP packet and an identifier of the wireless protocol data packet, and sends the third correspondence to the TCP subunit. The third correspondence is used by the TCP subunit to determine, based on the first characteristic information, the TCP packet corresponding to the first status information, and the first characteristic information is the identifier of the wireless protocol data packet.

In a possible implementation, the application processing unit includes a TCP subunit and an IP subunit. The IP subunit is configured to receive the TCP packet and an identifier of the TCP packet from the TCP subunit. The IP subunit is configured to send an IP data packet corresponding to the TCP packet and the identifier of the TCP packet to the modem unit, so that the modem unit establishes a third correspondence between the identifier of the TCP packet and an identifier of the wireless protocol data packet. The third correspondence is used by the modem unit to determine the identifier of the TCP packet based on the identifier of the wireless protocol data packet and use the identifier of the TCP packet as the first characteristic information.

In a possible implementation, that the TCP packet is not successfully sent to the base station is specifically: The wireless protocol data packet has been transmitted by the modem unit through an air interface, and when a discard timer corresponding to the wireless protocol data packet expires, the modem unit does not receive an ACK corresponding to the wireless protocol data packet from the base station; or when a discard timer corresponding to the wireless protocol data packet expires, the wireless protocol data packet is still not transmitted by the modem unit through an air interface.

In a possible implementation, the modem unit includes a packet data convergence protocol PDCP subunit, the PDCP subunit includes a priority send queue and a normal send queue, and a sending priority of a PDCP data packet in the priority send queue is higher than that of a PDCP data packet in the normal send queue. The application processing unit is configured to send a to-be-retransmitted packet and a retransmission indication of the TCP packet to the modem unit. The retransmission indication is used by the modem unit to add a PDCP data packet corresponding to the to-be-retransmitted packet to the priority send queue.

In a possible implementation, the application processing unit receives the first status information from a wireless protocol subunit in the modem. The wireless protocol subunit is one or any combination of the following:
 a PDCP subunit, a radio link control RLC subunit, and a media access control MAC subunit.

According to a third aspect, an embodiment of this application provides a terminal. The terminal includes an application processor and a modem. The application processor is configured to send a TCP packet to the modem, where the TCP packet is used by the modem to generate a wireless protocol data packet corresponding to the TCP packet, so that the modem sends the wireless protocol data packet to a base station. The application processor is further configured to receive first status information from the modem, where the first status information is status information of the wireless protocol data packet or status information of the TCP packet. The application processor is further configured to determine, based on the first status information, whether the TCP packet is successfully sent to the base station. If the TCP packet is successfully sent to the base station, the application processor is further configured to start a retransmission timer corresponding to the TCP packet. If the TCP packet is not successfully sent to the base station, the application processor is further configured to send the TCP packet to the modem again.

In a possible implementation, the status information of the TCP packet includes first characteristic information; and the application processor is further configured to determine, based on the first characteristic information, a TCP packet corresponding to the first status information.

In a possible implementation, the application processor includes a TCP module and an IP module. The IP module is configured to receive an identifier of the TCP packet from the TCP module, so as to establish a first correspondence between the identifier of the TCP packet and an identifier of an IP data packet corresponding to the TCP packet. The IP module is further configured to send the IP data packet to the modem, so that the modem obtains the identifier of the IP data packet from the IP data packet, and establishes a second correspondence between the identifier of the IP data packet and an identifier of the wireless protocol data packet. The first correspondence and the second correspondence are used to indicate a correspondence between the TCP packet and the wireless protocol data packet.

In a possible implementation, the IP module is further configured to send the first correspondence to the TCP module. The first correspondence is used by the TCP module to determine, based on the first characteristic information, the TCP packet corresponding to the first status information, and the first characteristic information is the identifier of the IP data packet that is determined by the modem based on the second correspondence and the identifier of the wireless protocol data packet.

In a possible implementation, the IP module is further configured to receive the second correspondence from the modem. The IP module is further configured to establish a third correspondence between the identifier of the TCP packet and the identifier of the wireless protocol data packet based on the first correspondence and the second correspondence. The IP module is further configured to send the third correspondence to the TCP module. The third correspondence is used by the TCP module to determine, based on the first characteristic information, the TCP packet corresponding to the first status information, and the first characteristic information is the identifier of the wireless protocol data packet.

In a possible implementation, the application processor includes a TCP module and an IP module. The IP module is further configured to receive the TCP packet and an identifier of the TCP packet from the TCP module. The IP module is further configured to send an IP data packet corresponding to the TCP packet and the identifier of the TCP packet to the modem, so that the modem establishes a third correspondence between the identifier of the TCP packet and an identifier of the wireless protocol data packet, and sends the third correspondence to the TCP module. The third correspondence is used by the TCP module to determine, based on the first characteristic information, the TCP packet corresponding to the first status information, and the first characteristic information is the identifier of the wireless protocol data packet.

In a possible implementation, the application processor includes a TCP module and an IP module. The IP module is configured to receive the TCP packet and an identifier of the TCP packet from the TCP module. The IP module is configured to send an IP data packet corresponding to the TCP packet and the identifier of the TCP packet to the modem, so that the modem establishes a third correspondence between the identifier of the TCP packet and an identifier of the wireless protocol data packet. The third correspondence is used by the modem to determine the identifier of the TCP packet based on the identifier of the wireless protocol data packet and use the identifier of the TCP packet as the first characteristic information.

In a possible implementation, that the TCP packet is not successfully sent to the base station is specifically: The wireless protocol data packet has been transmitted by the modem through an air interface, and when a discard timer corresponding to the wireless protocol data packet expires, the modem does not receive an ACK corresponding to the wireless protocol data packet from the base station; or when a discard timer corresponding to the wireless protocol data packet expires, the wireless protocol data packet is still not transmitted by the modem through an air interface.

In a possible implementation, the modem includes a packet data convergence protocol PDCP module, the PDCP module includes a priority send queue and a normal send queue, and a sending priority of a PDCP data packet in the priority send queue is higher than that of a PDCP data packet in the normal send queue. The application processor is configured to send a to-be-retransmitted packet and a retransmission indication of the TCP packet to the modem. The retransmission indication is used by the modem to add a PDCP data packet corresponding to the to-be-retransmitted packet to the priority send queue.

In a possible implementation, the application processor receives the first status information from a wireless protocol module in the modem. The wireless protocol module is one or any combination of the following:
 a PDCP module, a radio link control RLC module, and a media access control MAC module.

According to a fourth aspect, an embodiment of this application provides a computer storage medium. The computer storage medium includes computer instructions, and when the computer instructions are run on a terminal, the terminal is enabled to perform the method according to the first aspect.

According to a fifth aspect, an embodiment of this application provides a computer program product. When program code included in the computer program product is executed by a processor in a terminal, the method according to the first aspect is implemented.

According to a sixth aspect, an embodiment of this application provides a data processing method. The method is applied to a terminal. The terminal includes an application processor and a modem. The method includes: The application processor sends a TCP packet to the modem, and starts a retransmission timer of the TCP packet, where the TCP packet is used by the modem to generate a wireless protocol data packet corresponding to the TCP packet, so that the modem sends the wireless protocol data packet to a base station. When the retransmission timer of the TCP packet expires, and the terminal does not receive a TCP layer ACK of the TCP packet, the application processor sends retransmission information of the TCP packet to the modem, where the retransmission information includes a to-be-retransmitted packet of the TCP packet. When the modem receives the retransmission information, and the wireless protocol data packet is not discarded by the modem, the modem discards the wireless protocol data packet.

With reference to the sixth aspect, in a first possible implementation of the sixth aspect, the modem includes a PDCP module, the wireless protocol data packet is a PDCP data packet, the PDCP module includes a priority send queue and a normal send queue, and a sending priority of a PDCP data packet in the priority send queue is higher than that of a PDCP data packet in the normal send queue. The method further includes: The modem adds a PDCP data packet corresponding to the to-be-retransmitted packet to the priority send queue.

In this implementation, PDCP data of a packet may be preferentially retransmitted, so as to prevent or alleviate a problem that congestion at a wireless protocol layer is aggravated by a mechanism such as a fast retransmission mechanism.

With reference to the sixth aspect, in a second possible implementation of the sixth aspect, the retransmission information further includes first characteristic information, and the first characteristic information is used by the modem to determine a wireless protocol data packet corresponding to the retransmission information.

In this implementation, the retransmission information includes the first characteristic information, so that the modem can determine, based on the first characteristic information, the wireless protocol data packet corresponding to the retransmission information, and can further perform corresponding processing on the wireless protocol data packet.

With reference to the second possible implementation of the sixth aspect, in a third possible implementation of the sixth aspect, the application processor includes a TCP module and an IP module. That the application processor sends a TCP packet to the modem includes: The IP module receives an identifier of the TCP packet from the TCP module, so as to establish a first correspondence between the identifier of the TCP packet and an identifier of an IP data packet corresponding to the TCP packet; and the IP module sends the identifier of the IP data packet to the modem, so as to establish a second correspondence between the identifier of the IP data packet and an identifier of the wireless protocol data packet. The first correspondence and the second correspondence are used to indicate a correspondence between the TCP packet and the wireless protocol data packet.

In this implementation, the correspondence between the identifier of the TCP packet and the identifier of the IP data packet is established, and the correspondence between the identifier of the IP data packet and the identifier of the wireless protocol data packet is established, so that the correspondence between the TCP packet and the wireless protocol data packet can be obtained based on the two correspondences.

With reference to the third possible implementation of the sixth aspect, in a fourth possible implementation of the sixth aspect, the method further includes: The IP module sends the first correspondence to the TCP module. The first correspondence is used by the TCP module to determine the identifier of the IP data packet based on the identifier of the TCP packet, to obtain the first characteristic information.

In this implementation, the TCP module may store the correspondence between the identifier of the TCP packet and the identifier of the IP data packet, and therefore can determine the identifier of the IP data packet corresponding to the TCP packet based on the identifier of the TCP packet and use the identifier of the IP data packet as the first characteristic information.

With reference to the third possible implementation of the sixth aspect, in a fifth possible implementation of the sixth aspect, the method further includes: The IP module receives the second correspondence from the modem; the IP module establishes a third correspondence between the identifier of the TCP packet and the identifier of the wireless protocol data packet based on the first correspondence and the second correspondence; and the IP module sends the third correspondence to the TCP module. The third correspondence is used by the TCP module to determine the identifier of the wireless protocol data packet based on the TCP packet, to obtain the first characteristic information.

In this implementation, the correspondence between the identifier of the TCP packet and the identifier of the wireless protocol data packet may be established based on the correspondence between the identifier of the TCP packet and the identifier of the IP data packet and the correspondence between the identifier of the IP data packet and the identifier of the wireless protocol data packet. The TCP module may store the correspondence between the identifier of the TCP packet and the identifier of the wireless protocol data packet, and therefore can determine the identifier of the wireless protocol data packet corresponding to the TCP packet based on the identifier of the TCP packet, to obtain the first characteristic information.

With reference to the second possible implementation of the sixth aspect, in a sixth possible implementation of the sixth aspect, the application processor includes a TCP module and an IP module. That the application processor sends a TCP packet to the modem includes: The IP module receives the TCP packet and an identifier of the TCP packet from the TCP module; and the IP module sends an IP data packet corresponding to the TCP packet and the identifier of the TCP packet to the modem, so that the modem establishes a third correspondence between the identifier of the TCP packet and an identifier of the wireless protocol data packet. The third correspondence is used by the modem to determine, based on the first characteristic information, the wireless protocol data packet corresponding to the retransmission information, and the first characteristic information is the identifier of the TCP packet.

In this implementation, the modem may obtain the identifier of the TCP packet, then establish the correspondence between the identifier of the TCP packet and the identifier of the wireless protocol data packet, and send the correspondence to the TCP module, so that the TCP module can determine, based on the correspondence and the identifier of the TCP packet, the identifier of the wireless protocol data packet corresponding to the TCP packet, to obtain the first characteristic information.

With reference to the sixth aspect, in a seventh possible implementation of the sixth aspect, the method further includes: When the application processor receives a "discarded" indication corresponding to the TCP packet from the modem, the application processor sends the TCP packet to the modem again. The "discarded" indication is information sent by the modem when the TCP packet is not successfully sent to the base station. That the TCP packet is not successfully sent to the base station is specifically: The wireless protocol data packet has been transmitted by the modem through an air interface, and when a discard timer corresponding to the wireless protocol data packet expires, the modem does not receive an ACK corresponding to the wireless protocol data packet from the base station; or when a discard timer corresponding to the wireless protocol data packet expires, the wireless protocol data packet is still not transmitted by the modem through an air interface.

According to a seventh aspect, an embodiment of this application provides a data processing apparatus. The apparatus includes an application processing unit and a modem unit. The application processing unit is configured to send a TCP packet to the modem unit, and start a retransmission timer of the TCP packet, where the TCP packet is used by the modem unit to generate a wireless protocol data packet corresponding to the TCP packet, so that the modem unit sends the wireless protocol data packet to a base station. When the retransmission timer of the TCP packet expires, and the apparatus does not receive a TCP layer ACK of the TCP packet, the application processing unit is configured to send retransmission information of the TCP packet to the modem unit, where the retransmission information includes a to-be-retransmitted packet of the TCP packet. When the modem unit receives the retransmission information, and the wireless protocol data packet is not discarded by the modem unit, the modem unit is configured to discard the wireless protocol data packet.

According to an eighth aspect, an embodiment of this application provides a terminal. The terminal includes at least one processor, a memory, and a transceiver. The memory is configured to store computer-executable instructions. When the terminal runs, the at least one processor executes the computer-executable instructions stored in the memory, so that the terminal performs the method according to the sixth aspect.

According to a ninth aspect, an embodiment of this application provides a computer storage medium. The computer storage medium includes computer instructions, and when the computer instructions are run on a terminal, the terminal is enabled to perform the method according to the sixth aspect.

According to a tenth aspect, an embodiment of this application provides a computer program product. When program code included in the computer program product is executed by a processor in a terminal, the method according to the sixth aspect is implemented.

According to an eleventh aspect, an embodiment of this application provides a data processing method. The method is applied to a terminal. The terminal includes an application processor and a modem. The method includes: When the application processor receives a sending stop indication, the application processor stops sending a TCP packet to the modem. The sending stop indication is information sent by the modem to the application processor when a buffer of the modem is full or exceeds a preset threshold.

With reference to the eleventh aspect, in a first possible implementation of the eleventh aspect, the method further includes: When the application processor receives the sending stop indication, the application processor starts a backoff timer; and when the backoff timer expires, the application processor resumes sending a TCP packet to the modem.

With reference to the first possible implementation of the eleventh aspect, in a second possible implementation of the eleventh aspect, the sending stop indication includes the backoff timer. If the sending stop indication is information sent by the modem when the buffer of the modem is full, duration of the backoff timer is T1; or if the sending stop indication is information sent by the modem when the buffer of the modem exceeds the preset threshold, duration of the backoff timer is T2, where T1>T2.

With reference to the eleventh aspect, in a third possible implementation of the eleventh aspect, the sending stop indication further includes characteristic information of a discarded TCP packet. The method further includes: When the application processor resumes sending a TCP packet to the modem, the application processor preferentially resends the discarded TCP packet to the modem.

According to a twelfth aspect, an embodiment of this application provides a data processing apparatus. The apparatus includes an application processing unit and a modem unit. When the application processing unit receives a sending stop indication, the application processing unit is configured to stop sending a TCP packet to the modem unit. The sending stop indication is information sent by the modem unit to the application processing unit when a buffer of the modem unit is full or exceeds a preset threshold.

According to a thirteenth aspect, an embodiment of this application provides a terminal. The terminal includes at least one processor, a memory, and a transceiver. The memory is configured to store computer-executable instructions. When the terminal runs, the at least one processor executes the computer-executable instructions stored in the memory, so that the terminal performs the method according to the eleventh aspect.

According to a fourteenth aspect, an embodiment of this application provides a computer storage medium. The computer storage medium includes computer instructions, and when the computer instructions are run on a terminal, the terminal is enabled to perform the method according to the eleventh aspect.

According to a fifteenth aspect, an embodiment of this application provides a computer program product. When program code included in the computer program product is executed by a processor in a terminal, the method according to the eleventh aspect is implemented.

According to a sixteenth aspect, an embodiment of this application provides a data processing method. The method is applied to a terminal. The terminal includes an application processor and a modem. The method includes: The application processor receives a TCP packet sent by the modem. The application processor determines, based on a preset condition, whether an ACK corresponding to the TCP packet needs to be preferentially sent. If the ACK needs to be preferentially sent, the modem sends the ACK when the modem receives the ACK.

With reference to the sixteenth aspect, in a first possible implementation of the sixteenth aspect, the preset condition is that an application corresponding to the TCP packet is in a foreground working state, or the preset condition is that a TCP connection corresponding to the TCP packet is in a slow start phase.

With reference to the sixteenth aspect, in a second possible implementation of the sixteenth aspect, the modem includes a PDCP module, the PDCP module includes a priority send queue and a normal send queue, and a sending priority of a PDCP data packet in the priority send queue is higher than that of a PDCP data packet in the normal send queue. That the modem sends the ACK includes: The modem places the ACK at a first position of the priority send queue.

According to a seventeenth aspect, an embodiment of this application provides a data processing apparatus. The apparatus includes an application processing unit and a modem unit. The application processing unit is configured to receive a TCP packet sent by the modem unit. The application processing unit is configured to determine, based on a preset condition, whether an ACK corresponding to the TCP packet needs to be preferentially sent. If the ACK needs to be preferentially sent, the modem unit is configured to send the ACK when the modem unit receives the ACK.

According to an eighteenth aspect, an embodiment of this application provides a terminal. The terminal includes at least one processor, a memory, and a transceiver. The memory is configured to store computer-executable instructions. When the terminal runs, the at least one processor executes the computer-executable instructions stored in the memory, so that the terminal performs the method according to the sixteenth aspect.

According to a nineteenth aspect, an embodiment of this application provides a computer storage medium. The computer storage medium includes computer instructions, and when the computer instructions are run on a terminal, the terminal is enabled to perform the method according to the sixteenth aspect.

According to a twentieth aspect, an embodiment of this application provides a computer program product. When program code included in the computer program product is executed by a processor in a terminal, the method according to the sixteenth aspect is implemented.

The embodiments of this application provide the data processing method and apparatus, and the terminal, to establish a data packet correspondence between the application processor and the modem, so that the application processor and the modem can cooperate with each other to perform data transmission. This increases a data transmission rate and alleviates network congestion.

DETAILED DESCRIPTION OF ILLUSTRATIVE EMBODIMENTS

The following describes technical solutions in the embodiments of this application with reference to the accompanying drawings. It is clearly that the described embodiments are merely some but not all of the embodiments of this application. It should be noted that, in the embodiments of this application, unless otherwise specified, words such as "according to" and "based on" that use a factor as a premise or basis for a conclusion or an action may be understood as "at least according to" and "at least based on". In other words, the factor is only a sufficient condition for the conclusion or the action, not all sufficient conditions.

Figure 1:
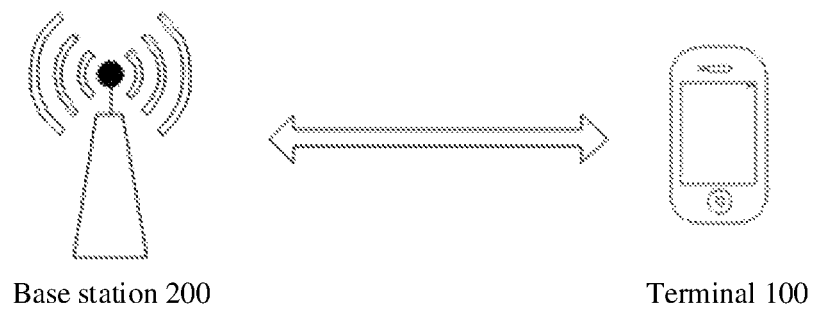
FIG. 1 is a schematic diagram of a structure of a wireless communications system according to an embodiment of this application.

FIG. 1 shows a wireless communications system applicable to this application. The system includes a terminal 100 and a base station 200.

The base station 200 may be specifically a next generation NodeB (generation node B, gNB) in a fifth generation (fifth generation, 5G) mobile communications network (referred to as a 5G network for short below) system, an evolved NodeB (evolved NodeB, eNB or eNodeB) in a fourth generation (fourth generation, 4G) mobile communications network (referred to as a 4G network for short below) system, or a base station in another possible radio access technology. Alternatively, the base station may be a base station NodeB, an evolved NodeB eNodeB, a base station in a fifth generation (fifth generation, 5G) communications system, a base station in a future communications system, or the like.

The terminal 100 includes but is not limited to a mobile phone (mobile phone), a tablet computer (Pad), a computer having a wireless transceiver function, a virtual reality (Virtual Reality, VR) terminal device, an augmented reality (Augmented Reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like.

Figure 2:
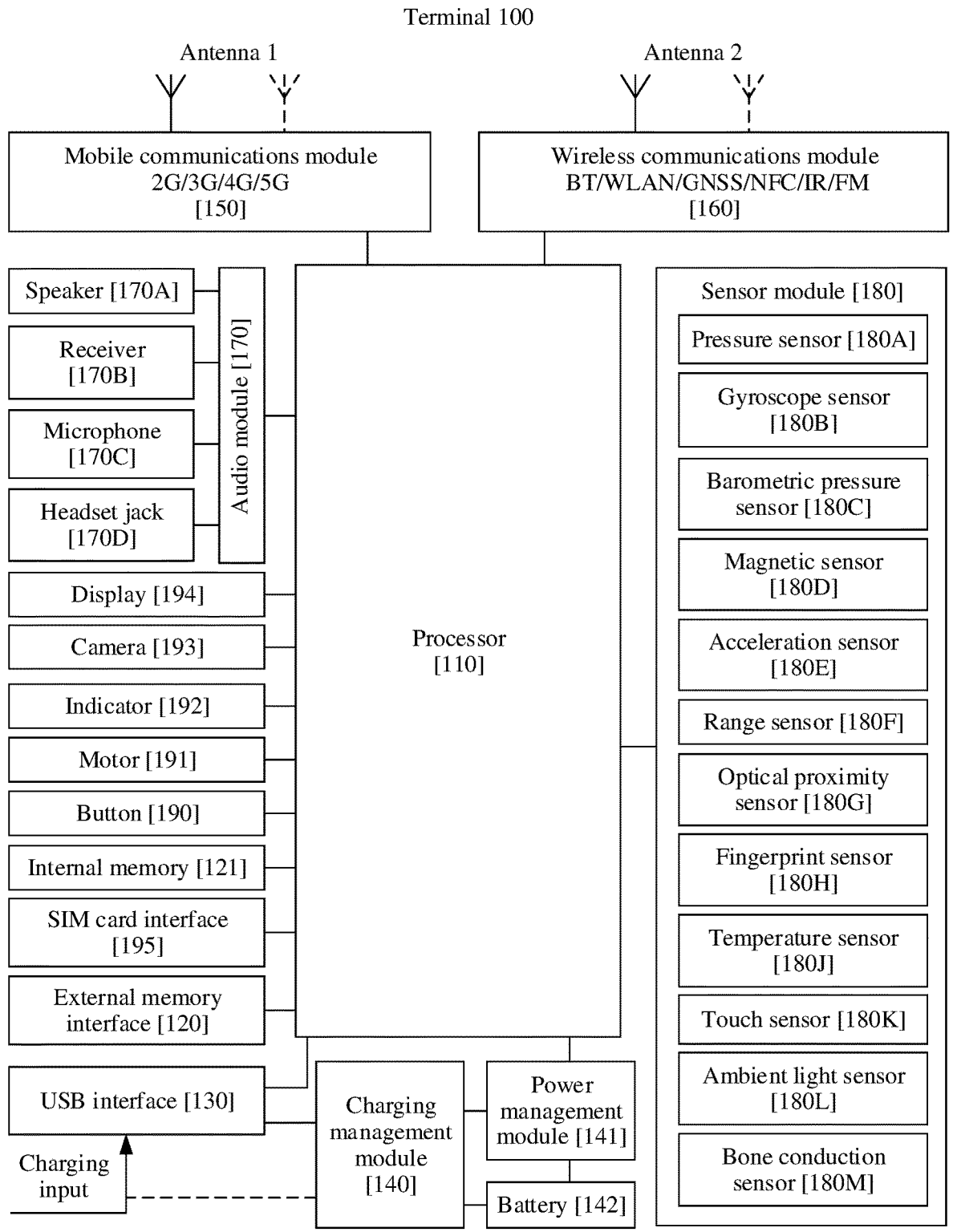
FIG. 2 is a schematic diagram of a structure of a terminal according to an embodiment of this application.

FIG. 2 is a schematic diagram of a structure of the terminal 100.

The terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the terminal 100. In some other embodiments of this application, the terminal 100 may include more or fewer components than those shown in the figure, or combine some components, or split some components, or have different component arrangements. The components shown in the figure may be implemented through hardware, software, or a combination of software and hardware.

The processor no may include an application processor (application processor, AP) and a modem (modem).

In some embodiments, the processor no may further include one or more of a graphics processing unit (graphics processing unit, GPU), an image signal processor (image signal processor, ISP), a controller, a video codec, a digital signal processor (digital signal processor, DSP), a baseband processor, a neural network processing unit (neural-network processing unit, NPU), and/or the like. Different processing units may be independent components, or may be integrated into one or more processors.

The controller may generate an operation control signal based on instruction operation code and a time sequence signal, to complete control of instruction fetching and instruction execution.

A memory may be further disposed in the processor no, and is configured to store instructions and data. In some embodiments, the memory in the processor no is a cache. The memory may store instructions or data that has just been used or is cyclically used by the processor no. If the processor no needs to use the instructions or the data again, the processor may directly invoke the instructions or the data from the memory. This avoids repeated access and reduces a waiting time of the processor no, thereby improving system efficiency.

A wireless communication function of the terminal 100 may be implemented through the antenna 1, the antenna 2, the mobile communications module 150, the wireless communications module 160, the modem, the baseband processor, and the like.

The antenna 1 and the antenna 2 are configured to transmit and receive electromagnetic wave signals. Each antenna in the terminal 100 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 can provide a solution, applied to the terminal 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through at least two antennas including the antenna 1, perform processing such as filtering or amplification on the received electromagnetic wave, and transmit a processed electromagnetic wave to the modem for demodulation. The mobile communications module 150 may further amplify a signal modulated by the modem, and convert an amplified signal into an electromagnetic wave through the antenna 1 for radiation. In some embodiments, at least some function modules in the mobile communications module 150 may be disposed in the processor no. In some embodiments, at least some function modules in the mobile communications module 150 may be disposed in a same device as at least some modules in the processor no.

The modem may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem may be an independent component. In some other embodiments, the modem may be independent of the processor no, and is disposed in a same device as the mobile communications module 150 or another function module. In some other embodiments, the mobile communications module 150 may be a module in the modem.

The wireless communications module 160 may provide a solution, applied to the terminal 100, to wireless communication including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor no. The wireless communications module 160 may further receive a to-be-sent signal from the processor no, perform frequency modulation and amplification on the signal, and convert a processed signal into an electromagnetic wave through the antenna 2 for radiation.

In some embodiments, in the terminal 100, the antenna 1 is coupled to the mobile communications module iso, and the antenna 2 is coupled to the wireless communications module 160, so that the terminal 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), a fifth generation, new radio (new radio, NR), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The application processor may process application-layer data according to a TCP protocol to generate a TCP packet, and process the TCP packet according to an internet protocol (internet protocol, IP) to generate an IP data packet. The application processor sends the IP data packet to the modem in the terminal, so that the modem processes the IP data packet and sends a processed IP data packet to the base station as a wireless signal. The modem processes the IP data packet according to a wireless protocol to generate a wireless protocol data unit (protocol data unit, PDU), and sequentially sends and receives the wireless protocol PDU by setting and checking a sequence number (sequence number, SN) of the wireless protocol PDU. Particularly, according to a packet data convergence protocol (packet data convergence protocol, PDCP) in the wireless protocol, each time one PDCP PDU is generated, the modem starts a discard timer (discard timer, DT) for the PDCP PDU. A timing length of the discard timer is configured by the base station or locally configured by the terminal. When the discard timer expires, the PDCP module still does not initiate transmission of the PDU or the PDU is still not successfully sent to the base station. In this case, the PDU is discarded. The PDCP module has a buffer space, and the buffer space is used to buffer data (a PDCP SDU or a PDCP PDU) that is not successfully sent to the base station. The buffer space of the PDCP module is limited. When the buffer space is full but there is still data to be sent to the PDCP module, one implementation is that a PDCP layer discards last sent data, that is, data that is stored in the buffer space for the shortest time; and another implementation is that a PDCP layer discards earliest sent data, in other words, a data packet that is stored in the buffer space for the longest time. Because the application processor in the terminal is unaware of a status in which the modem processes the wireless protocol PDU, it is difficult to cooperate with the modem. Consequently, a data transmission rate is affected. Especially in a network congestion case, network congestion is further aggravated.

In the embodiments of this application, a data packet correspondence between the application processor and the modem may be established, so that the application processor and the modem can cooperate with each other to perform data transmission. This increases a data transmission rate and alleviates network congestion.

Figure 3:
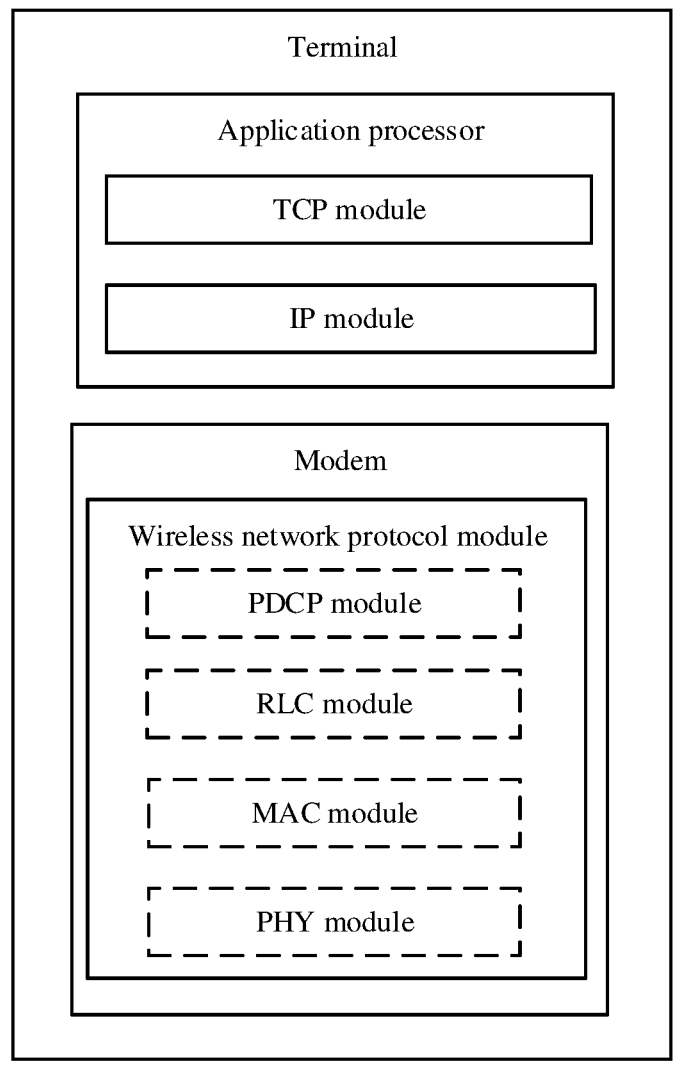
FIG. 3 is a schematic block diagram of a terminal according to an embodiment of this application.

Refer to FIG. 3. For ease of description, in this embodiment of this application, a TCP module is defined in the application processor according to the TCP protocol, and an IP module is defined in the application processor according to the IP protocol. The TCP module is configured to process application-layer data according to the TCP protocol to generate a TCP packet. The IP module is configured to process the TCP packet according to the IP protocol to generate an IP data packet. A wireless protocol module is configured to process the IP data packet according to the wireless protocol to generate a wireless protocol data unit (protocol data unit, PDU).

In this instance of this application, the wireless protocol is specifically a protocol of a 5G/4G protocol stack. Specifically, the wireless protocol includes a packet data convergence protocol (packet data convergence protocol, PDCP), an RLC protocol, a MAC protocol, and a PHY protocol. A PDCP module, an RLC module, a MAC module, and a PHY module may be respectively defined in the modem according to the PDCP protocol, the RLC protocol, and the MAC protocol. The PDCP module, the RLC module, and the MAC module may be collectively referred to as a wireless protocol module. Unless otherwise specified, the wireless protocol module mentioned below is one or any combination of the PDCP module, the RLC module, and the MAC module.

Next, in different embodiments, a data processing method in the embodiments of this application is described. The method may be performed by the terminal 100. In the method, a correspondence between a TCP packet and a wireless protocol PDU may be first established, and by using the established correspondence, a start time of a retransmission timer at a TCP layer is set or the TCP layer and the wireless protocol layer notify each other of an exception, and a to-be-retransmitted TCP packet may be further preferentially sent. Therefore, the TCP layer and the wireless protocol layer can cooperate to process data. This increases a data transmission rate and alleviates network congestion.

Next, in each embodiment, the data processing method provided in this application is described by using an example. It should be noted that, in the following embodiments, unless otherwise specified, the TCP module and the IP module are modules in the application processor in the terminal 100, and the wireless protocol module is a module in the modem in the terminal 100.

Figure 4A:
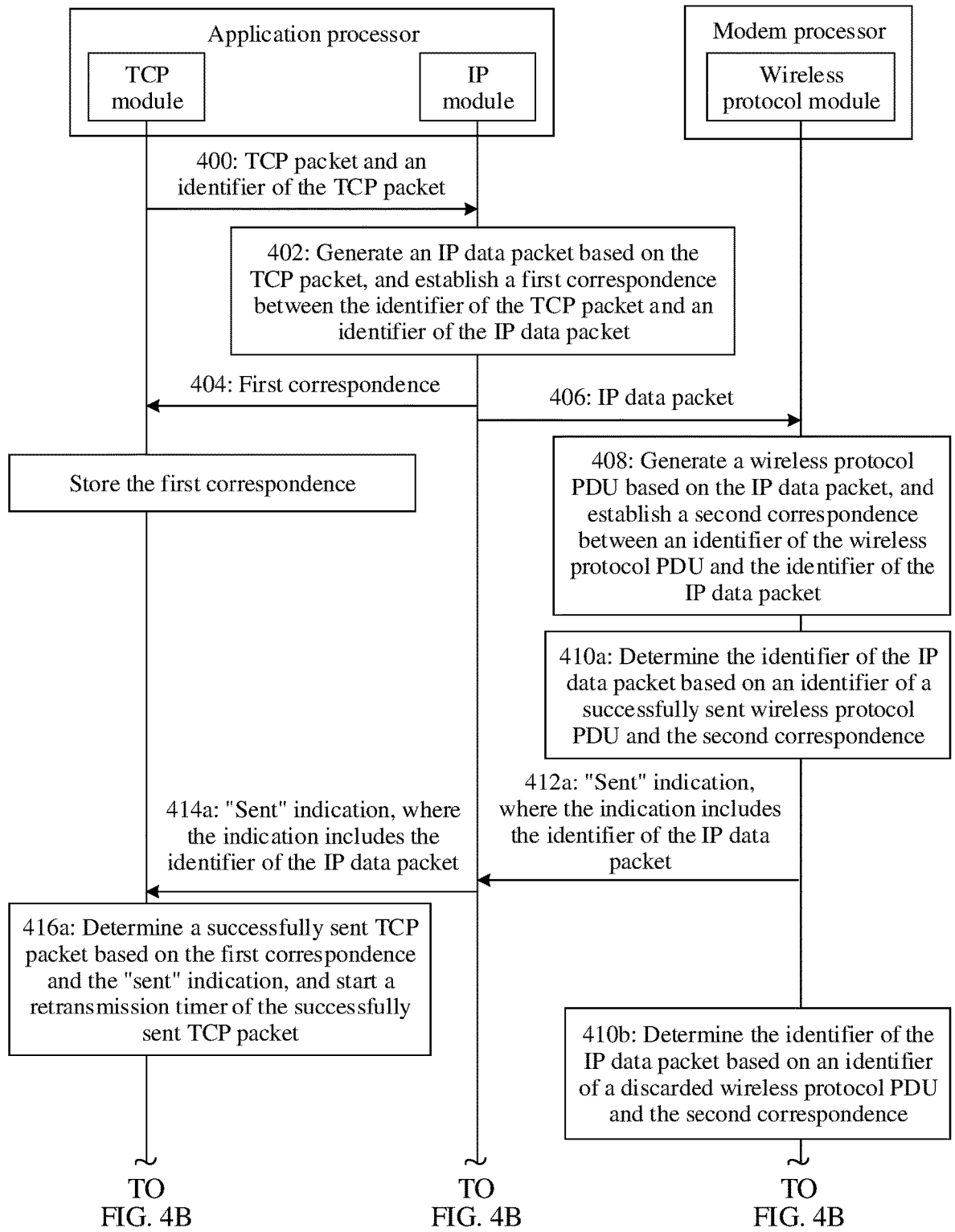
FIG. 4A and FIG. 4B are a flowchart of a data processing method according to an embodiment of this application.
Figure 4B:
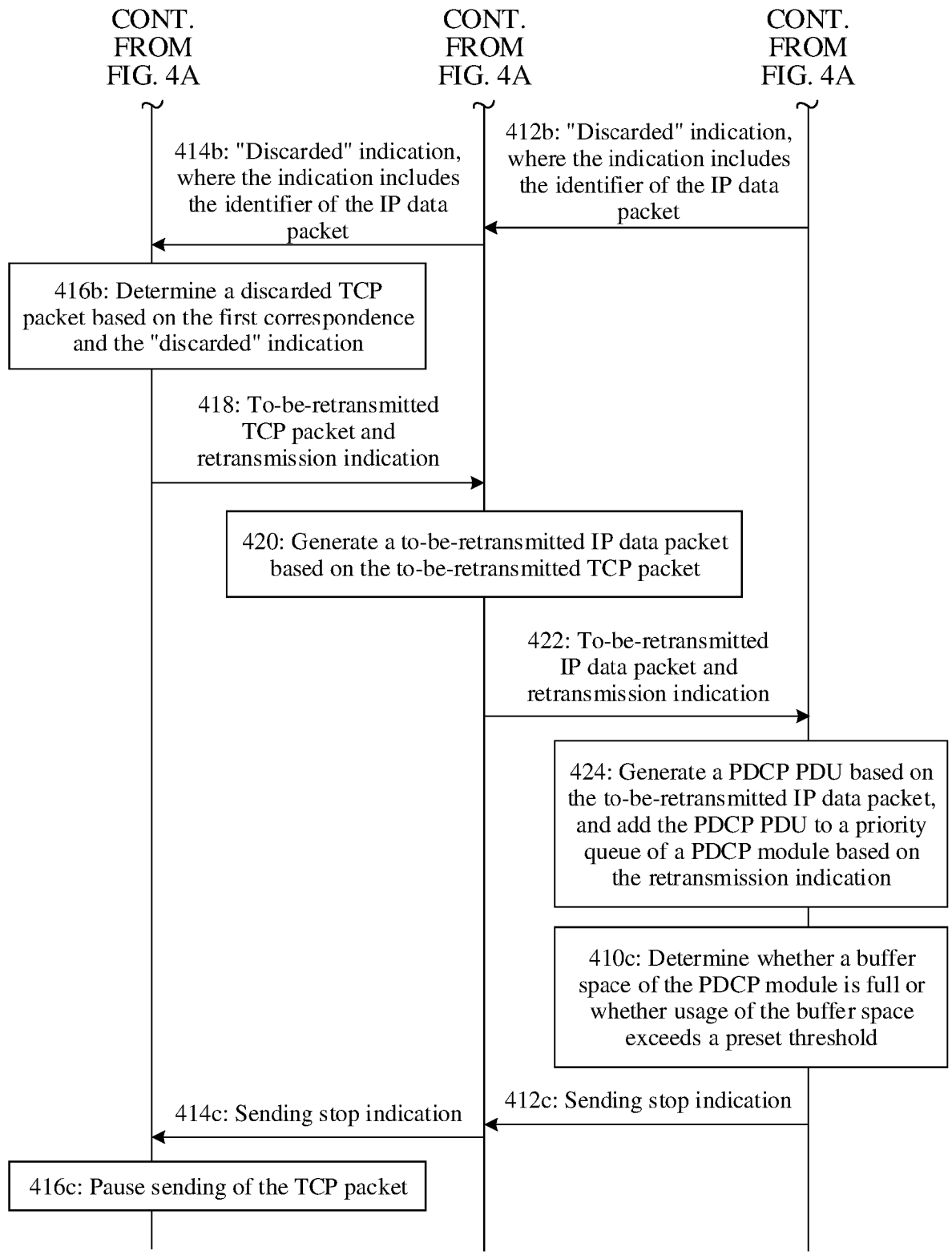

An embodiment of this application provides a data processing method, so that an indirect correspondence between a TCP packet and a wireless protocol PDU can be established by using an identifier of an IP data packet, and a start time of a retransmission timer at a TCP layer can be set. As shown in FIG. 4A and FIG. 4B, the data processing method provided in this embodiment of this application may include the following steps.

Step 400: A TCP module sends a TCP packet and an identifier of the TCP packet to an IP module.

A structure of the TCP packet may include a TCP header and a TCP data part, and the TCP header may include a sequence number of the TCP packet.

In some examples, the identifier of the TCP packet is the sequence number of the TCP packet. The sequence number of the TCP packet may be a relative sequence number. When a terminal starts a TCP session, an initial sequence number of the TCP session is random, which may be any value of 0, 4, 294, 967, and 295. The initial sequence number may be set to 0, an amount of data that needs to be transmitted in the TCP session is 100000 bytes, and a TCP packet length is 1000 bytes. In this case, 100 packets are constructed for the TCP session. A sequence number 0 is allocated to a first packet, a sequence number 1000 is allocated to a second packet, and so on. Each sequence number is filled in a sequence number field in a corresponding TCP packet header. For one TCP session, each packet sequence number is unique, and can identify a corresponding packet. Therefore, a sequence number of a packet may be used as an identifier of the packet.

Step 402: The IP module generates an IP data packet based on the TCP packet, and establishes a first correspondence between the identifier of the TCP packet and an identifier of the IP data packet.

Generally, the IP module does not parse the TCP packet header. Even if the TCP packet header includes the packet identifier, the IP module does not obtain the identifier in the TCP packet header. Therefore, in this embodiment, the TCP module sends the identifier of the TCP packet and the TCP packet to the IP module, so that the IP module maps the identifier of the TCP packet to the TCP packet.

When receiving the TCP packet, the IP module may encapsulate the TCP packet into the IP data packet (packet). Each time one IP data packet is generated, one identifier (identifier, ID) of the IP data packet is allocated to represent the IP data packet.

As described above, the IP module receives the identifier of the TCP packet and the TCP packet, so as to identify a correspondence between the TCP packet and the identifier of the TCP packet; and can further establish the first correspondence between the identifier of the TCP packet and the identifier of the IP data packet generated based on the TCP packet.

Step 404: The IP module sends the first correspondence to the TCP module, so that the TCP module stores the first correspondence.

Each time one first correspondence is established, the IP module may send the established first correspondence to the TCP module.

The TCP module may store first correspondences corresponding to a plurality of TCP packets. Specifically, recording may be performed by using a first correspondence record table. In some examples, a structure of the first correspondence record table may be shown in Table 1.

TABLE 1

| 1 | Identifier of a TCP packet A: Identifier of an IP data packet A |
| 2 | Identifier of a TCP packet B: Identifier of an IP data packet B |
| 3 | Identifier of a TCP packet C: Identifier of an IP data packet C |

Step 406: The IP module sends the IP data packet to the wireless protocol module.

It should be noted that, although step 404 is first described and then step 406 is described above, it does not mean that step 406 is necessarily performed after step 404. Step 406 may be performed before step 404, or may be performed together with step 404, or may be performed after step 404.

In some embodiments, during actual implementation, the IP model sends the IP data packet to the wireless protocol module, in other words, the application processor in the terminal sends the IP data packet to the modem in the terminal, which may be specifically implemented in a physical copy manner, or in a manner in which the application processor and the modem share a memory, that is, a manner without performing physical copy but using a pointer.

Step 408: The wireless protocol module generates a wireless protocol PDU based on the IP data packet, and establishes a second correspondence between an identifier of the wireless protocol PDU and the identifier of the IP data packet.

In some embodiments, the IP module may send the identifier of the IP data packet and the IP data packet to the wireless protocol module, so that the wireless protocol module maps the identifier of the IP data packet to the IP data packet.

The wireless protocol module processes each received IP data packet as a wireless protocol layer SDU, to generate a wireless protocol layer PDU corresponding to each IP data packet. The wireless protocol layer PDU may be referred to as a wireless protocol PDU. As described above, the wireless protocol module sets a sequence number for each wireless protocol PDU. The wireless protocol module sets sequence numbers to ensure that wireless protocol PDUs can be sequentially sent and a duplicate wireless protocol PDU can be detected. Therefore, a sequence number of a wireless protocol PDU may be used to identify the wireless protocol PDU. In other words, the identifier of the wireless protocol PDU may be specifically a sequence number of the wireless protocol PDU.

In some embodiments, the wireless protocol module such as the PDCP module may parse a header of the IP data packet to obtain the identifier of the IP data packet, and establish and store the second correspondence between the identifier of the wireless protocol PDU corresponding to the IP data packet and the identifier of the IP data packet.

The wireless protocol module may store second correspondences corresponding to a plurality of wireless protocol PDUs. Specifically, recording may be performed by using a second correspondence record table. In some examples, a structure of the second correspondence record table may be shown in Table 2.

TABLE 2

| 1 | Identifier of the IP data packet A: Identifier of a wireless protocol PDU A |
| 2 | Identifier of the IP data packet B: Identifier of a wireless protocol PDU B |
| 3 | Identifier of the IP data packet C: Identifier of a wireless protocol PDU C |

In some embodiments, the second correspondence is specifically a correspondence between the identifier of the IP data packet and an identifier of a PDCP PDU. The PDCP module directly receives the identifier of the IP data packet. Therefore, the PDCP module may establish the correspondence between the identifier of the IP data packet and the identifier of the PDCP PDU, that is, the second correspondence. The identifier of the PDCP PDU may be a sequence number of the PDCP PDU.

In some embodiments, the second correspondence is specifically a correspondence between the identifier of the IP data packet and an identifier of an RLC PDU. In an example, the PDCP module may send the identifier of the IP data packet and the PDCP PDU corresponding to the IP data packet to the RLC module, so that the RLC module generates the RLC PDU corresponding to the IP data packet, and establishes the correspondence between the identifier of the IP data packet and the identifier of the RLC PDU, that is, the second correspondence. The identifier of the RLC PDU may be a sequence number of the RLC PDU.

In some embodiments, the second correspondence is specifically a correspondence between the identifier of the IP data packet and an identifier of a MAC PDU. In an example, the PDCP module may send the identifier of the IP data packet and the PDCP PDU corresponding to the IP data packet to the RLC module, so that the RLC module generates the RLC PDU corresponding to the IP data packet. Then, the RLC module sends the RLC PDU corresponding to the IP data packet to the MAC module, so that the MAC module generates the MAC PDU corresponding to the IP data packet, and establishes the correspondence between the identifier of the IP data packet and the identifier of the MAC PDU, that is, the second correspondence. The identifier of the MAC PDU may be a sequence number of the MAC PDU.

According to steps 400 to 408, the TCP module sends the TCP packet to the wireless protocol module, and the TCP module and the wireless protocol module respectively store the first correspondence and the second correspondence. The first correspondence is used by the TCP module to determine a TCP packet that is successfully or not successfully sent. The second correspondence is used by the wireless protocol module to feed back, to the TCP module, a TCP packet that is successfully or not successfully sent.

In some embodiments, when any wireless protocol PDU is successfully sent, the wireless protocol module may perform step 410*a* to determine the identifier of the IP data packet based on an identifier of the successfully sent wireless protocol PDU and the second correspondence.

The successfully sent wireless protocol PDU specifically means that the wireless protocol PDU has been sent to the base station through an air interface, and an ACK fed back by the base station is received.

In some embodiments, the wireless protocol PDU is specifically a MAC PDU, and the second correspondence is specifically a correspondence between the identifier of the IP data packet and an identifier of the MAC PDU. When the MAC module obtains an ACK that corresponds to a MAC PDU and that is received by the terminal from the base station, the MAC module may parse the ACK to obtain the MAC PDU corresponding to the ACK, and may learn, based on the second correspondence, an identifier of a successfully sent IP data packet.

In some embodiments, the wireless protocol PDU is specifically an RLC PDU, and the second correspondence is specifically a correspondence between the identifier of the IP data packet and an identifier of the RLC PDU. When the RLC module obtains an ACK that corresponds to an RLC PDU and that is received by the terminal from the base station, the RLC module may parse the ACK to obtain the RLC PDU corresponding to the ACK, and may learn, based on the second correspondence, an identifier of a successfully sent IP data packet.

In some embodiments, the wireless protocol PDU is specifically a PDCP PDU, and the second correspondence is specifically a correspondence between the identifier of the IP data packet and an identifier of the PDCP PDU. When the RLC module obtains an ACK that corresponds to an RLC PDU and that is received by the terminal from the base station, the RLC module may parse the ACK to obtain the RLC PDU corresponding to the ACK. The RLC module notifies the PDCP module of the PDCP PDU corresponding to the successfully sent RLC PDU, so that the PDCP module learns, based on the second correspondence, an identifier of a successfully sent IP data packet.

In some embodiments, after determining the successfully sent wireless protocol PDU, the wireless protocol module may send, to the TCP module, an indication indicating that the wireless protocol PDU is sent. The "sent" indication includes the identifier of the IP data packet. The "sent" indication is information used to indicate that the TCP packet corresponding to the identifier of the IP data packet included in the indication is successfully sent to the base station. The "sent" indication may be an indication indicating "successfully sent", or may be an indication indicating "received by the base station", or may be an indication indicating "sent through an air interface", or the like. A specific implementation form of the "sent" indication is not limited in this embodiment of this application. Any information used by the TCP module to determine that the TCP packet is successfully sent to the base station falls within an included range of the "sent" indication in this embodiment of this application.

In some embodiments, the "sent" indication may be sent to the TCP module by performing steps 412*a* and 414*a*.

Step 412*a*: The wireless protocol module sends the "sent" indication to the IP module, where the indication includes the identifier of the IP data packet.

Step 414*a*: The IP module sends the "sent" indication to the TCP module, where the indication includes the identifier of the IP data packet.

In some embodiments, the wireless protocol module may directly send the "sent" indication to the TCP module. In other words, the "sent" indication does not need to be forwarded by the IP module.

Step 416*a*: The TCP module determines the successfully sent TCP packet based on the first correspondence and the "sent" indication, and starts a retransmission timer of the successfully sent TCP packet.

In step 416*a*, the TCP module may obtain the identifier of the IP data packet in the indication indicating "successfully sent", and then may learn of, with reference to the first correspondence, the TCP packet corresponding to the wireless protocol PDU that is successfully sent by the wireless protocol module.

According to steps 412*a* to 416*a*, the wireless protocol module may feed back the successfully sent TCP packet to the TCP module.

In some embodiments, when the retransmission timer of the TCP packet expires, the ACK of the TCP packet is still not received. In this case, retransmission of the TCP packet is initiated, and step 418 may be performed.

Step 418: The TCP module sends a to-be-retransmitted TCP packet and a retransmission indication to the IP module.

The TCP module sends the retransmission indication and the to-be-retransmitted TCP packet to the IP module, so that the IP module can identify a correspondence between the retransmission indication and the to-be-retransmitted packet.

Step 420: The IP module generates an IP data packet based on the to-be-retransmitted TCP packet.

Step 422: The IP module sends the to-be-retransmitted IP data packet and the retransmission indication to the wireless protocol module.

In some embodiments, the wireless protocol module is specifically a PDCP module. The IP module sends the retransmission indication and the to-be-retransmitted IP data packet to the PDCP module, so that the PDCP module can identify a correspondence between the retransmission indication and the IP data packet.

Step 424: The PDCP module may generate a PDCP PDU based on the to-be-retransmitted IP data packet, and add the to-be-retransmitted PDCP PDU to a priority send queue of the PDCP module based on the retransmission indication.

Specifically, the PDCP module controls two queues: a priority queue and a normal queue. The PDCP module sends an IP data packet in the priority queue before sending an IP data packet in the normal queue. An IP data packet corresponding to a new to-be-transmitted TCP packet is usually added to the normal queue. An IP data packet and an ACK corresponding to a to-be-retransmitted TCP packet are added to the priority queue.

In some examples, in step 418, the TCP module may further send an identifier of the to-be-retransmitted TCP packet and the to-be-retransmitted TCP packet to the IP module. In step 420, the IP module may establish a first correspondence between the identifier of the to-be-retransmitted TCP packet and an identifier of the to-be-retransmitted IP data packet. The IP module may send the first correspondence between the identifier of the to-be-retransmitted TCP packet and the identifier of the to-be-retransmitted IP data packet to the TCP module. In step 422, the IP module may send the identifier of the to-be-retransmitted IP data packet and the to-be-retransmitted IP data packet to the PDCP module. In step 424, the PDCP module may establish a second correspondence between the identifier of the to-be-retransmitted IP data packet and the to-be-retransmitted PDCP PDU. For details, refer to the foregoing descriptions of step 400 to step 408. Details are not described herein again. The retransmission indication may be a priority sending indication, or may be a priority queue sending indication, or the like. A specific implementation form of the retransmission indication is not limited in this embodiment of this application. Any information used by the wireless protocol module to determine to send the TCP packet by using the priority queue falls within an included range of the retransmission indication in this embodiment of this application.

In the method embodiment shown in FIG. 4A and FIG. 4B, for any TCP packet, when sending the TCP packet to the wireless protocol module, the TCP module does not immediately start a retransmission timer, but starts a retransmission timer of the TCP packet after determining that the TCP packet is successfully sent to the base station. This can prevent a problem that congestion at the wireless protocol layer is aggravated because the wireless protocol layer has a duplicate TCP packet when the TCP module initiates retransmission of the TCP packet in a case in which the TCP packet is still queued at the wireless protocol layer. In addition, during retransmission, the retransmission indication is used, so that the wireless protocol module preferentially sends a wireless protocol PDU corresponding to the to-be-retransmitted TCP packet. This can prevent a problem that congestion at the wireless protocol layer is aggravated because a new to-be-transmitted TCP packet sent before a to-be-retransmitted TCP packet may trigger fast retransmission.

In some embodiments, the wireless protocol module is specifically a PDCP module. Correspondingly, the wireless protocol PDU is a PDCP PDU. As described above, each time one PDCP PDU is generated, a discard timer (discard timer, DT) is started for the PDCP PDU. When the discard timer expires, the PDCP module still does not initiate transmission of the PDCP PDU or the PDCP PDU is still not successfully sent to the base station. In this case, the PDCP module discards the PDCP PDU, and then performs step 410b. In some examples, that the PDCP module does not initiate transmission of the PDCP PDU specifically means that the PDCP module does not send the PDCP PDU to a local RLC module. In some examples, that the PDCP PDU is not successfully transmitted to the base station means that the local RLC module does not receive, from the base station, an ACK of an RLC PDU corresponding to the PDCP PDU, or a local MAC module does not receive, from the base station, an ACK of an RLC PDU corresponding to the PDCP PDU.

In some embodiments, the PDCP module may perform step 410b to determine the identifier of the IP data packet based on an identifier of the discarded PDCP PDU and the second correspondence. The PDCP module may send a "discarded" indication to the TCP module. The "discarded" indication includes the identifier of the IP data packet. The identifier of the IP data packet is the identifier of the IP data packet corresponding to the PDCP PDU discarded in step 410b. The "discarded" indication is information used to indicate that the TCP packet corresponding to the identifier of the IP data packet included in the indication is discarded by the PDCP module. The "discarded" indication may be an indication indicating "not successfully sent", or may be an indication indicating a packet loss, or may be an indication indicating "not sent through an air interface", or the like. A specific implementation form of the "discarded" indication is not limited in this embodiment of this application. Any information used by the TCP module to determine that the TCP packet is not successfully sent to the base station or information discarded by the PDCP module falls within an included range of the "discarded" indication in this embodiment of this application. In some embodiments, the PDCP module may send the "discarded" indication to the TCP module by performing step 412b and step 414b.

Step 412b: The PDCP wireless protocol module sends the "discarded" indication to the IP module, where the indication includes the identifier of the IP data packet.

Step 414b: The IP module sends the "discarded" indication to the TCP module, where the indication includes the identifier of the IP data packet.

In some embodiments, the PDCP module may directly send the "discarded" indication to the TCP module. In other words, the "discarded" indication does not need to be forwarded by the IP module.

When the TCP module receives the "discarded" indication, step 416b may be performed.

Step 416b: The TCP module determines, based on the first correspondence and the "discarded" indication, that the TCP packet is discarded.

The TCP module may obtain the identifier of the IP data packet from the "discarded" indication, and further determine the discarded TCP packet based on the corresponding first correspondence.

In some embodiments, after determining the discarded TCP packet, the TCP module may initiate retransmission of the discarded TCP packet, and further perform step 418. Then, the IP module may perform step 420 and step 422, and the PDCP module may perform step 424.

For details, refer to the foregoing descriptions. Details are not described herein again.

In this embodiment, after a PDCP PDU corresponding to a TCP packet is discarded at the PDCP layer, a "discarded" indication may be used, so that the TCP module quickly initiates retransmission of the discarded TCP packet. This can increase a network rate. In addition, a retransmission indication is used, so that the PDCP module preferentially sends the PDCP PDU corresponding to the to-be-retransmitted TCP packet. This can prevent a problem that congestion at the wireless protocol layer is aggravated because a new to-be-transmitted TCP packet sent before a to-be-retransmitted TCP packet may trigger fast retransmission.

In the method embodiment shown in FIG. 4A and FIG. 4B, an indirect correspondence between a TCP packet and a wireless protocol PDU that include same data may be established by using an identifier of an IP data packet. Therefore, when the wireless protocol module sends the wireless protocol PDU, the TCP module is indicated to start a retransmission timer for the TCP packet corresponding to the wireless protocol PDU. This can prevent a problem that congestion at the wireless protocol layer is aggravated because the wireless protocol layer has a duplicate TCP packet when the TCP module initiates retransmission of the TCP packet in a case in which the TCP packet is still queued at the wireless protocol layer. In addition, when the PDCP module discards the PDCP PDU, the TCP can quickly initiate retransmission of the discarded TCP packet, and the PDCP module can preferentially send the PDCP PDU corresponding to the to-be-retransmitted TCP packet. This can prevent a problem that congestion at the wireless protocol layer is aggravated because TCP packet retransmission triggers fast retransmission.

In some embodiments, in the method embodiment shown in FIG. 4A and FIG. 4B, the wireless protocol module may be specifically a PDCP module. Correspondingly, the wireless protocol PDU is a PDCP PDU. As described above, when a buffer space of the PDCP module is full and a discard principle of the PDCP module is discarding an earliest buffer packet, the PDCP module discards an earliest data packet sent to the PDCP module, and further performs step 410b. When the buffer space of the PDCP module is full and the discard principle of the PDCP module is discarding a latest buffer packet, the PDCP module discards a latest data packet sent to the PDCP module, and further performs step 410b. An earliest discarded buffer packet is specifically a data packet that enters the PDCP buffer space earliest in all data buffered by the PDCP module, that is, a data packet that enters the PDCP module for a longest time in all data packets currently buffered by the PDCP module. A latest discarded buffer packet is specifically a data packet that enters the PDCP buffer space last in all data packets buffered by the PDCP module, that is, a data packet that enters the PDCP module for a shortest time.

In some embodiments, the PDCP module may perform step 410c, in other words, the PDCP module determines whether the PDCP buffer space is full or whether usage of the buffer space exceeds a preset threshold. In an example, the preset threshold may be specifically that the usage of the buffer space exceeds 95%. When the PDCP buffer space is full or the usage of the PDCP buffer space exceeds the preset threshold, the PDCP module may send a sending stop indication to the TCP module by performing step 412c and step 414c. The sending stop indication is used to indicate the TCP module to stop sending the TCP packet to the wireless protocol module. The sending stop indication may be a backoff timer (back of timer), or may be a sending pause indication, or may be an indication indicating that the PDCP buffer space is full, or the like. A specific implementation form of the sending stop indication is not limited in this embodiment of this application. Any information used by the TCP module to stop sending the TCP packet falls within an included range of the sending stop indication in this embodiment of this application. When the sending stop indication is the backoff timer or the sending stop indication includes the backoff timer, the TCP module does not send the TCP packet before the backoff timer expires.

In some embodiments, as described above, the PDCP module may send the sending stop indication when the buffer space of the PDCP module is full, or may send the sending stop indication when the buffer space of the PDCP module exceeds the preset threshold. The PDCP module may add the backoff timer to the sending stop indication, or may use the backoff timer as the sending stop indication. The PDCP module may set different duration for backoff timers sent in two cases. In an example, when the buffer space of the PDCP module is full, the duration of the backoff timer sent by the PDCP module to the TCP module may be T1. When the usage of the buffer space of the PDCP module exceeds the preset threshold, the duration of the backoff timer sent by the PDCP module may be T2, where T1 is greater than T2.

In some embodiments, the PDCP module may send the sending stop indication to the TCP module by performing step 412c and step 414c.

Step 412c: The PDCP module sends the sending stop indication to the IP module.

Step 414c: The IP module sends the sending stop indication to the TCP module.

In some embodiments, the PDCP module may directly send the sending stop indication to the TCP module. In other words, the sending stop indication does not need to be forwarded by the IP module.

When the TCP module receives the sending stop indication, the TCP module pauses sending of the TCP packet.

Step 416c: The TCP module may determine, based on the sending stop indication, that the buffer space of the PDCP module is full or the usage of the buffer space exceeds the preset threshold, and pause sending of the TCP packet.

The TCP module may start one backoff timer, and start to send a TCP packet again when the backoff timer expires. The backoff timer may be a timer stored inside the TCP, or may be a timer sent by the PDCP module to the TCP module.

The TCP module may further restart to send the TCP packet based on indication information of the PDCP module. In other words, when determining that the usage of the buffer space is less than the threshold, the PDCP module sends, to the TCP module, information used by the TCP module to determine that the TCP packet can be sent, so that the TCP packet restarts to send the TCP packet based on the information.

In step 410c, when the PDCP buffer space is full or the usage of the PDCP buffer space exceeds the preset threshold, the PDCP module may discard at least one PDCP PDU, and may further determine, based on an identifier of the discarded PDCP PDU and the second correspondence, an identifier of an IP data packet corresponding to the discarded PDCP PDU. The PDCP module may send the "discarded" indication to the TCP module. The "discarded" indication includes the identifier of the IP data packet. The identifier of the IP data packet is the identifier of the IP data packet corresponding to the PDCP PDU discarded in step 410c. The "discarded" indication is information used to indicate that the TCP packet corresponding to the identifier of the IP data packet included in the indication is discarded by the PDCP module. The "discarded" indication may be an indication indicating "not successfully sent", or may be an indication indicating a packet loss, or may be an indication indicating "not sent through an air interface", or the like. A specific implementation form of the "discarded" indication is not limited in this embodiment of this application. Any information used by the TCP module to determine that the TCP packet is not successfully sent to the base station or information discarded by the PDCP module falls within an included range of the "discarded" indication in this embodiment of this application.

The PDCP module may send the "discarded" indication to the TCP module by performing step 412c and step 414c. In one example, the "discarded" indication may be included in the sending stop indication. In one example, the "discarded" indication may be transmitted to the TCP module together with the sending stop indication by performing step 412c and step 414c.

If step 412c and step 414c further include a "discarded" indication, the TCP module further determines a discarded TCP packet, and retransmits the discarded TCP packet when the TCP packet can be resent, so that step 418 and subsequent steps can be performed. For details, refer to the foregoing descriptions. Details are not described herein again.

In this embodiment, when the buffer space of the PDCP layer is full, the sending stop indication may be used, so that the TCP module pauses sending of a new TCP packet. This can prevent a problem that congestion at the wireless protocol layer is aggravated because TCP packet retransmission is triggered due to a TCP packet loss.

In the method embodiment shown in FIG. 4A and FIG. 4B, a PDCP PDU, an RLC PDU, and a MAC PDU may be collectively referred to as a wireless protocol data packet; a "sent" indication and a "discarded" indication may also be collectively referred to as status information of a TCP packet; and an identifier of an IP data packet may be referred to as first characteristic information.

Figure 5A:
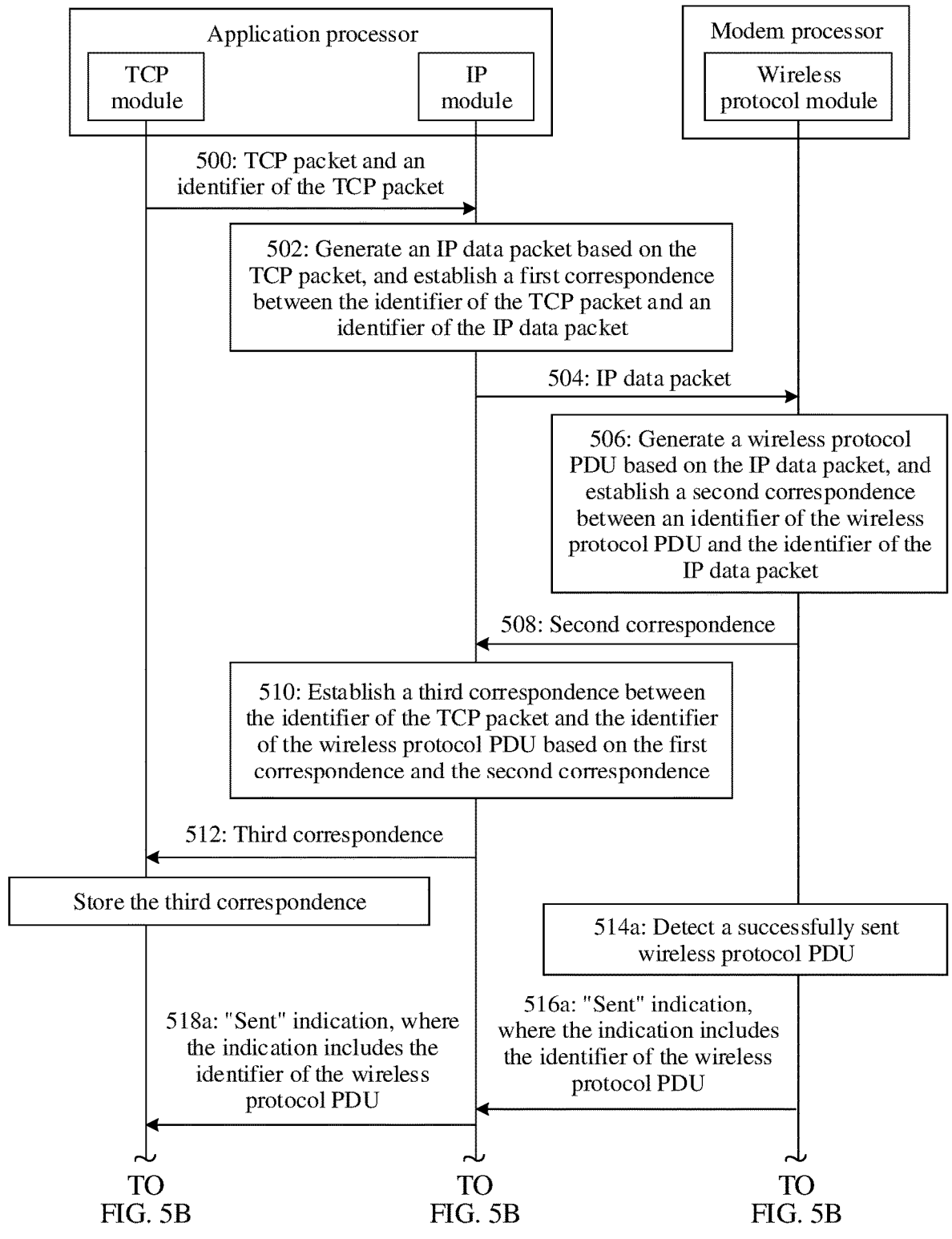
FIG. 5A and FIG. 5B are a flowchart of a data processing method according to an embodiment of this application.
Figure 5B:
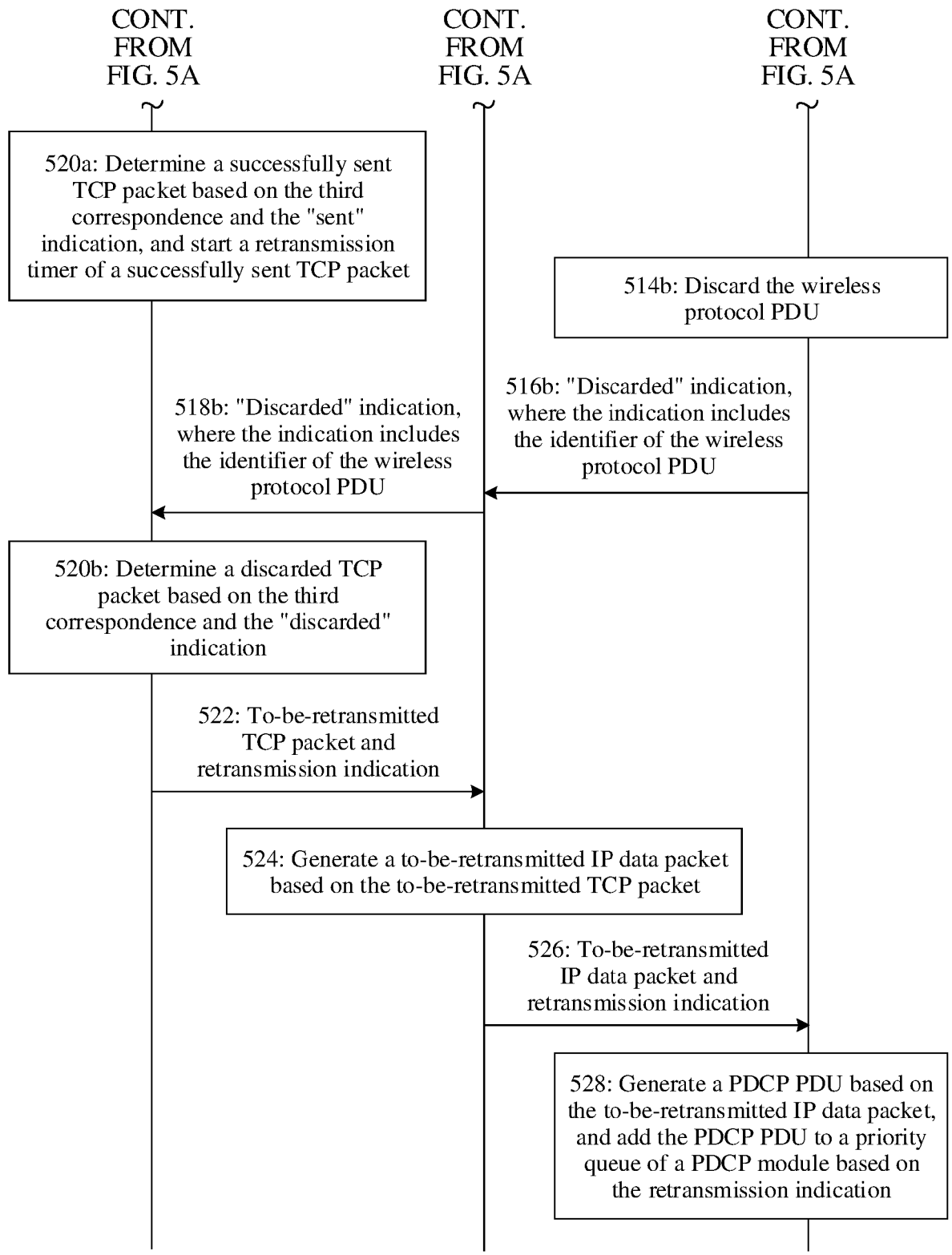

An embodiment of this application provides a data processing method, so that a direct correspondence between a TCP packet and a wireless protocol PDU can be established, and a start time of a retransmission timer at a TCP layer can be set. As shown in FIG. 5A and FIG. 5B, the data processing method provided in this embodiment of this application may include the following steps:

Step 500: A TCP module sends a TCP packet and an identifier of the TCP packet to an IP module.

In this embodiment, for the identifier of the TCP packet, refer to the foregoing descriptions of the TCP packet in the method embodiment shown in FIG. 4A and FIG. 4B. Details are not described herein again.

Step 502: Generate an IP data packet based on the TCP packet, and establish a first correspondence between the identifier of the TCP packet and an identifier of the IP data packet.

In this embodiment, for the identifier of the IP data packet, refer to the foregoing descriptions of the identifier of the IP data packet in the method embodiment shown in FIG. 4A and FIG. 4B. For the first correspondence, refer to the foregoing descriptions of the first correspondence in the method implementation shown in FIG. 4A and FIG. 4B. Details are not described herein again.

Step 504: The IP module sends the IP data packet to a wireless protocol module.

Step 506: The wireless protocol module generates a wireless protocol PDU based on the IP data packet, and establishes a second correspondence between an identifier of the wireless protocol PDU and the identifier of the IP data packet.

In this embodiment, for the second correspondence, refer to the foregoing descriptions of the second correspondence in the method embodiment shown in FIG. 4A and FIG. 4B. Details are not described herein again.

Step 508: The wireless protocol module sends the second correspondence to the IP module.

Step 510: The IP module establishes a third correspondence between the identifier of the TCP packet and the identifier of the wireless protocol PDU based on the first correspondence and the second correspondence.

Step 512: The IP module sends the third correspondence to the TCP module, so that the TCP module stores the third correspondence.

The TCP module may store third correspondences corresponding to a plurality of TCP packets. Specifically, recording may be performed by using a third correspondence record table. In some examples, a structure of the third correspondence record table may be shown in Table 3.

TABLE 3

| 1 | Identifier of the TCP packet A: Identifier of a wireless protocol PDU A |
|---|---|
| 2 | Identifier of the TCP packet B: Identifier of a wireless protocol PDU B |
| 3 | Identifier of the TCP packet C: Identifier of a wireless protocol PDU C |

In some embodiments, when performing step 514*a*, in other words, after detecting a successfully sent wireless protocol PDU (for the successfully sent wireless protocol PDU, refer to the foregoing descriptions of the method shown in FIG. 4A and FIG. 4B, and details are not described herein again), the wireless protocol module may send a "sent" indication to the TCP module. The "sent" indication includes an identifier of the successfully sent wireless protocol PDU detected in step 514. The "sent" indication is used to indicate that the wireless protocol PDU corresponding to the identifier of the wireless protocol PDU included in the indication is successfully sent by the wireless protocol module.

In some embodiments, the "sent" indication may be sent to the TCP module by performing steps 516*a* and 518*a*. Step 516*a*: The wireless protocol module sends the "sent" indication to the IP module, where the indication includes the identifier of the successfully sent wireless protocol PDU detected in step 514*a*. After receiving the "sent" indication, the IP module may perform step 518*a* to send the "sent" indication to the TCP module.

In some embodiments, the wireless protocol module may directly send the "sent" indication to the TCP module. In other words, the "sent" indication" is not forwarded by the IP module.

After receiving the "sent" indication, the TCP module may perform step 520*a* to determine the successfully sent TCP packet based on the third correspondence and the "sent" indication, and start a retransmission timer of the successfully sent TCP packet.

In step 520*a*, the TCP module may obtain the identifier of the wireless protocol PDU in the "sent" indication, and then may learn of, with reference to the third correspondence, the TCP packet corresponding to the wireless protocol PDU that is successfully sent by the wireless protocol module.

In some embodiments, when the timer of the TCP packet expires, an ACK corresponding to the TCP packet is still not received. In this case, retransmission of the TCP packet is initiated, and step 522 is performed.

Step 522: The TCP module sends a to-be-retransmitted TCP packet and a retransmission indication to the IP module.

The retransmission indication is information used to indicate to preferentially send a data packet, and the retransmission indication may be referred to as a high priority indication, or may be referred to as a priority sending indication, or the like. Any indication information used by the wireless protocol module to determine to preferentially send the wireless protocol PDU falls within an included range of the retransmission indication.

The TCP module sends the retransmission indication and the to-be-retransmitted TCP packet to the IP module, so that the IP module can identify a correspondence between the retransmission indication and the to-be-retransmitted TCP packet.

Step 524: The IP module generates a to-be-retransmitted IP data packet based on the to-be-retransmitted TCP packet.

Step 526: The IP module sends the to-be-retransmitted IP data packet and the retransmission indication to the wireless protocol module.

The wireless protocol module is specifically a PDCP module. The IP module sends the retransmission indication and the to-be-retransmitted IP data packet to the PDCP module, so that the PDCP module can identify a correspondence between the retransmission indication and the IP data packet.

Step 528: The PDCP module may generate a to-be-retransmitted PDCP PDU based on the to-be-retransmitted IP data packet, and add the to-be-retransmitted PDCP PDU to a priority send queue of the PDCP module based on the retransmission indication.

In some examples, in step 522, the TCP module may further send an identifier of the to-be-retransmitted TCP packet and the to-be-retransmitted TCP packet to the IP module. In step 524, the TCP module may establish a first correspondence between the identifier of the to-be-retransmitted TCP packet and an identifier of the to-be-retransmitted IP data packet. In step 528, the PDCP module may parse a header of the to-be-retransmitted IP data packet to obtain the identifier of the IP data packet from the header, and establish a second correspondence between the identifier of the to-be-retransmitted IP data packet and the to-be-retransmitted PDCP PDU. Then, the PDCP module may send the second correspondence corresponding to the to-be-retransmitted TCP packet to the IP module, so that the IP module establishes, based on the second correspondence corresponding to the to-be-retransmitted TCP packet and the first correspondence corresponding to the to-be-retransmitted TCP packet, a third correspondence corresponding to the to-be-retransmitted TCP packet. Then, the IP module may send the third correspondence corresponding to the to-be-retransmitted TCP packet to the TCP module, so that the TCP module stores the third correspondence corresponding to the to-be-retransmitted TCP packet. For details, refer to the foregoing descriptions of step 500 to step 512. Details are not described herein again.

In this embodiment, for any TCP packet, when sending the TCP packet to a lower-layer module, the TCP module does not immediately start a retransmission timer, but starts a retransmission timer of the TCP packet after the wireless protocol module sends the wireless protocol PDU corresponding to the TCP packet. This can prevent a problem that congestion at the wireless protocol layer is aggravated because the wireless protocol layer has a duplicate TCP packet when the TCP module initiates retransmission of the TCP packet in a case in which the TCP packet is still queued at the wireless protocol layer.

In some embodiments, the wireless protocol module is specifically a PDCP module. Correspondingly, the wireless protocol PDU is a PDCP PDU. When a discard timer expires, the PDCP module still does not initiate transmission of the PDCP PDU or the PDCP PDU is still not successfully sent to a base station. In this case, the PDCP module may perform step 514b to discard the PDCP PDU.

After performing step 514b, in other words, after discarding the PDCP PDU, the PDCP module may send a "discarded" indication to the TCP module. The "discarded" indication includes the identifier of the PDCP PDU. The identifier of the PDCP PDU is the identifier of the PDCP PDU discarded in step 514b. The "discarded" indication is used to indicate that the TCP packet corresponding to the identifier of the PDCP PDU included in the indication is discarded by the PDCP module.

In some embodiments, the "discarded" indication may be sent to the TCP module by performing step 516b and step 518b.

Step 516b: The PDCP module sends the "discarded" indication to the IP module, where the indication includes the identifier of the discarded PDCP PDU. After receiving the "discarded" indication, the IP module may perform step 518b to send the "discarded" indication to the TCP module.

In some embodiments, the PDCP module may directly send the "discarded" indication to the TCP module. In other words, the "discarded" indication is not forwarded by the IP module.

After receiving the "discarded" indication, the TCP module may perform step 520b to determine, based on the third correspondence and the "discarded" indication, the TCP packet corresponding to the discarded PDCP PDU.

The TCP module may obtain the identifier of the PDCP PDU from the "discarded" indication, and then determine the discarded TCP packet with reference to the third correspondence.

In some embodiments, after determining the discarded TCP packet, the TCP module may initiate retransmission of the discarded TCP packet, in other words, may perform step 522. Then, the IP module may perform step 524 and step 526, and the PDCP module may perform step 528 and subsequent steps. For details, refer to the foregoing descriptions.

In this embodiment, after a PDCP PDU corresponding to a TCP packet is discarded at the wireless protocol layer, a "discarded" indication may be used, so that the TCP module may quickly initiate retransmission of the discarded TCP packet. In addition, a retransmission indication is used, so that the wireless protocol module preferentially sends the wireless protocol PDU corresponding to the to-be-retransmitted TCP packet. This can prevent a problem that congestion at the wireless protocol layer is aggravated because a new to-be-transmitted TCP packet sent before a to-be-retransmitted TCP packet may trigger fast retransmission.

In the method embodiment shown in FIG. 5A and FIG. 5B, the wireless protocol module may be a PDCP module. The PDCP module may determine whether a PDCP buffer space is full or whether usage of the PDCP buffer space exceeds a preset threshold. If the buffer space is full or the usage of the PDCP buffer space exceeds the preset threshold, the sending stop indication may be sent to the TCP module. For details, refer to the foregoing descriptions of the method implementation shown in FIG. 4A and FIG. 4B. Details are not described herein again.

In the method embodiment shown in FIG. 5A and FIG. 5B, a PDCP PDU, an RLC PDU, and a MAC PDU may be collectively referred to as a wireless protocol data packet; a "sent" indication and a "discarded" indication may also be collectively referred to as status information of a wireless protocol data packet; and an identifier of the wireless protocol data packet may be referred to as first characteristic information.

In the method embodiment shown in FIG. 5A and FIG. 5B, a correspondence between a TCP packet and a wireless protocol PDU that include same data may be established. Therefore, when the wireless protocol module sends the wireless protocol PDU, the TCP module is indicated to start a retransmission timer for the TCP packet corresponding to the wireless protocol PDU. This can prevent a problem that congestion at the wireless protocol layer is aggravated because the wireless protocol layer has a duplicate TCP packet when the TCP module initiates retransmission of the TCP packet in a case in which the TCP packet is still queued at the wireless protocol layer. In addition, when the PDCP module discards the PDCP PDU, the TCP can quickly initiate retransmission of the discarded TCP packet, and the PDCP module can preferentially send the PDCP PDU corresponding to the to-be-retransmitted TCP packet. This can prevent a problem that congestion at the wireless protocol layer is aggravated because a new to-be-transmitted TCP packet sent before a to-be-retransmitted TCP packet may trigger fast retransmission.

Figure 6A:
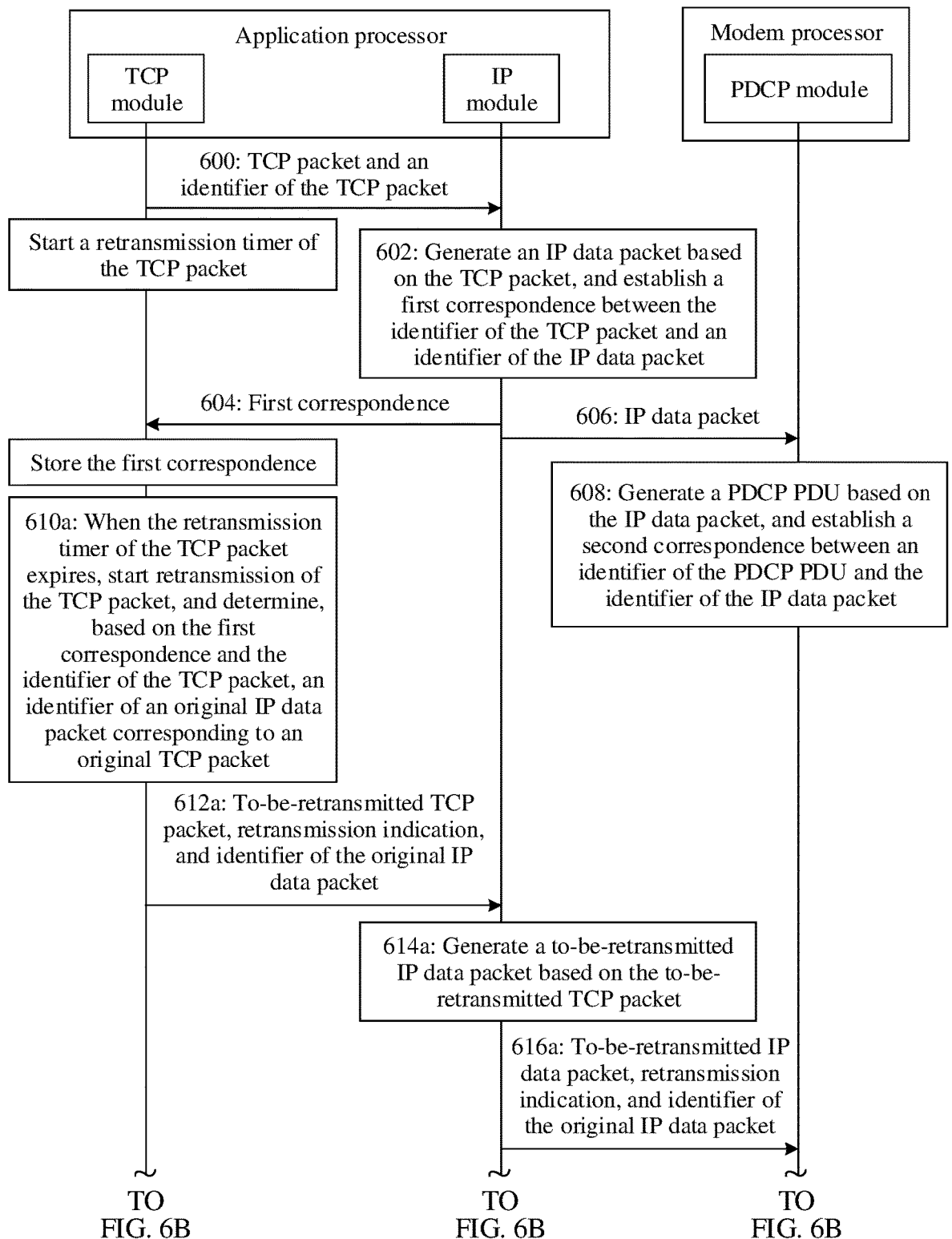
FIG. 6A and FIG. 6B are a flowchart of a data processing method according to an embodiment of this application.
Figure 6B:
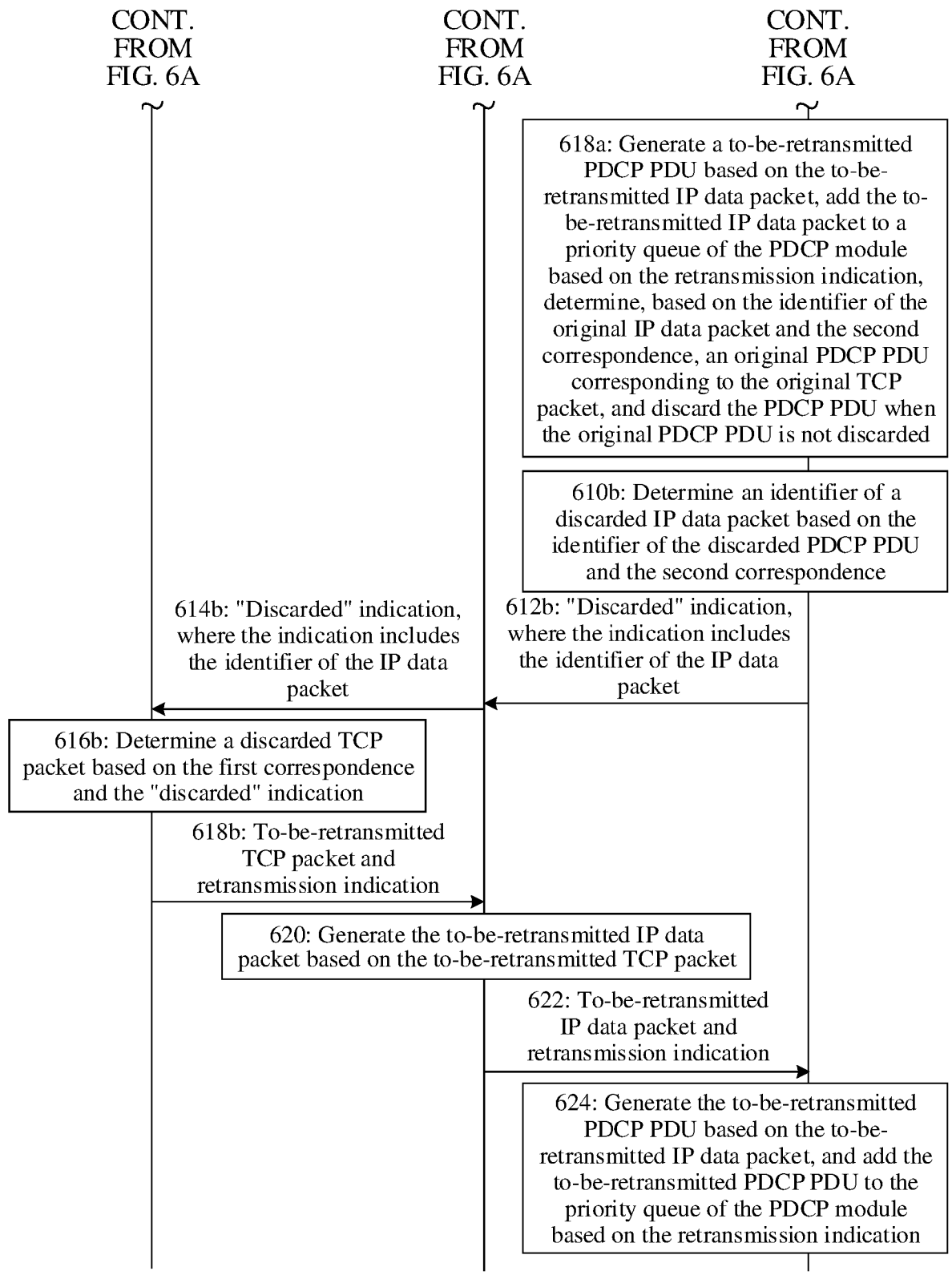

An embodiment of this application provides a data processing method, so that an indirect correspondence between a TCP packet and a PDCP PDU can be established by using an identifier of an IP data packet. Based on the indirect correspondence between a TCP packet and a wireless protocol PDCP PDU, a TCP module and a wireless protocol PDCP module may notify each other of an exception. As shown in FIG. 6A and FIG. 6B, the data processing method provided in this embodiment of this application may include the following steps.

Step 600: The TCP module sends a TCP packet and an identifier of the TCP packet to an IP module.

In step 600, each time the TCP module sends the TCP packet to the IP module, a retransmission timer of the TCP packet is started.

Step 602: The IP module generates an IP data packet based on the TCP packet, and establishes a first correspondence between the identifier of the TCP packet and an identifier of the IP data packet.

Step 604: The IP module sends the first correspondence to the TCP module, so that the TCP module stores the first correspondence.

Step 606: The IP module sends the IP data packet to the PDCP module.

Step 608: The PDCP module generates a PDCP PDU based on the IP data packet, and establishes a second correspondence between an identifier of the PDCP PDU and the identifier of the IP data packet.

In this embodiment, for the second correspondence, refer to the foregoing descriptions of the second correspondence in the method embodiment shown in FIG. 4A and FIG. 4B. Details are not described herein again.

In some embodiments, for any TCP packet, when a retransmission timer of the TCP packet expires, the TCP module may perform step 610*a* to start retransmission of the TCP packet, and determine, based on the first correspondence and an identifier of the TCP packet, an identifier of an original IP data packet corresponding to the original TCP packet.

As described above for the identifier of the TCP packet in the method embodiment shown in FIG. 4A and FIG. 4B, the original TCP packet and a to-be-retransmitted TCP packet corresponding to the original TCP packet have a same identifier. Therefore, the identifier of the original IP data packet corresponding to the original TCP packet may be determined based on a first correspondence corresponding to the original TCP packet and the identifier of the TCP packet.

Step 612*a*: The TCP module sends the to-be-retransmitted TCP packet, a retransmission indication, and the identifier of the original IP data packet to the IP module.

In some embodiments, in step 612*a*, the TCP module further sends an identifier of the to-be-retransmitted TCP packet to the IP module.

Step 614*a*: The IP module generates the to-be-retransmitted IP data packet based on the to-be-retransmitted TCP packet.

In some embodiments, in step 614*a*, the IP module may establish a first correspondence between the identifier of the to-be-retransmitted TCP packet and the identifier of the to-be-retransmitted IP data packet. In addition, the IP module may send the first correspondence between the identifier of the to-be-retransmitted TCP packet and the identifier of the to-be-retransmitted IP data packet to the TCP module, so that the TCP module replaces the first correspondence between the identifier of the original TCP packet and the identifier of the original IP data packet with the first correspondence between the identifier of the to-be-retransmitted TCP packet and the identifier of the to-be-retransmitted IP data packet.

Step 616*a*: The IP module sends the to-be-retransmitted IP data packet and the identifier of the original IP data packet to the PDCP module.

In some embodiments, in step 616*a*, the IP module further sends the identifier of the to-be-retransmitted IP data packet to the PDCP module.

Step 618*a*: The PDCP module generates a to-be-retransmitted PDCP PDU based on the to-be-retransmitted IP data packet, adds the to-be-retransmitted IP data packet to a priority queue of the PDCP module based on the retransmission indication, and determines, based on the identifier of the original IP data packet and the second correspondence, an original PDCP PDU corresponding to the original TCP packet. When the original PDCP PDU is not sent or discarded, the PDCP module may discard the original PDCP PDU.

In some examples, in step 618*a*, the PDCP module may establish a second correspondence between the identifier of the to-be-retransmitted IP data packet and the identifier of the to-be-retransmitted PDCP PDU, and replace the second correspondence between the identifier of the original IP data packet and the identifier of the original PDCP PDU with the second correspondence between the identifier of the to-be-retransmitted IP data packet and the identifier of the to-be-retransmitted PDCP PDU.

In this embodiment, when the to-be-retransmitted TCP packet is sent to a PDCP layer, if an original PDCP PDU of the TCP packet still exists at the wireless protocol PDCP layer, the original PDCP PDU may be deleted, so that congestion at the PDCP layer can be prevented from being aggravated by a duplicate PDCP PDU.

In some embodiments, when the PDCP module discards any PDCP PDU, the PDCP module may perform step 610*b* to determine the identifier of the IP data packet based on an identifier of the discarded PDCP PDU and the second correspondence. For a step in which the PDCP module discards the PDCP PDU, refer to the descriptions in the embodiments shown in FIG. 4A and FIG. 4B and FIG. 5A and FIG. 5B. Details are not described herein again.

Step 612*b*: The PDCP module sends a "discarded" indication to the IP module, where the indication includes the identifier of the IP data packet.

The identifier of the IP data packet is the identifier of the IP data packet corresponding to the PDCP PDU discarded in step 710*b*. The "discarded" indication is used to indicate that the TCP packet corresponding to the identifier of the IP data packet included in the indication is discarded by the PDCP module.

In some embodiments, the "discarded" indication may be sent to the TCP module by performing step 614*b* and step 616*b*.

Step 614*b*: The IP module sends the "discarded" indication to the TCP module, where the indication includes the identifier of the IP data packet.

Step 616*b*: The TCP module determines the discarded TCP packet based on the first correspondence and the "discarded" indication.

In some embodiments, the PDCP module may directly send the "discarded" indication to the TCP module. In other words, the "discarded" indication is not forwarded by the IP module.

The TCP module may obtain the identifier of the IP data packet from the "discarded" indication, and further determine the discarded TCP packet based on the corresponding first correspondence.

After determining the discarded TCP packet, the TCP module may initiate retransmission of the discarded TCP packet, and further perform step 618*b*.

Step 618*b*: The TCP module sends a to-be-retransmitted TCP packet and a retransmission indication for the discarded TCP packet to the IP module.

The TCP module sends the retransmission indication and the to-be-retransmitted TCP packet to the IP module, so that the IP module can identify a correspondence between the retransmission indication and the to-be-retransmitted packet.

In some embodiments, after step 618, the IP module may perform step 620 and step 622.

Step 620: The IP module generates the to-be-retransmitted IP data packet based on the to-be-retransmitted TCP packet.

Step 622: The IP module sends the to-be-retransmitted IP data packet and the retransmission indication to the PDCP module.

After step 622, the PDCP module may perform step 624.

Step 624: The PDCP module generates the to-be-retransmitted PDCP PDU based on the to-be-retransmitted IP data packet, and adds the to-be-retransmitted PDCP PDU to the priority queue based on the retransmission indication.

In this embodiment, after a PDCP PDU corresponding to a TCP packet is discarded at the PDCP layer, a "discarded" indication may be used, so that the TCP module quickly initiates retransmission of the discarded TCP packet. This can increase a network rate. In addition, a retransmission indication is used, so that the PDCP module preferentially sends the PDCP PDU corresponding to the to-be-retransmitted TCP packet. This can prevent a problem that congestion at the PDCP layer is aggravated because a new to-be-transmitted TCP packet sent before a to-be-retransmitted TCP packet may trigger fast retransmission.

In some examples, in step 618*b*, the TCP module may further send the identifier of the to-be-retransmitted TCP packet and the to-be-retransmitted TCP packet to the IP module. In step 620, the IP module may establish the first correspondence between the identifier of the to-be-retransmitted TCP packet and the identifier of the to-be-retransmitted IP data packet. The IP module may send the first correspondence between the identifier of the to-be-retransmitted TCP packet and the identifier of the to-be-retransmitted IP data packet to the TCP module. In step 622, the IP module may send the identifier of the to-be-retransmitted IP data packet and the to-be-retransmitted IP data packet to the PDCP module. In step 624, the PDCP module may establish the second correspondence between the identifier of the to-be-retransmitted IP data packet and the to-be-retransmitted PDCP PDU. For details, refer to the foregoing descriptions of step 600 to step 608. Details are not described herein again.

In this embodiment, an indirect correspondence between a TCP packet and a PDCP PDU that include same data may be established by using an identifier of an IP data packet, so that the PDCP module can delete an original PDCP PDU during data retransmission, so that congestion at the PDCP layer is prevented by a duplicate PDCP PDU. Moreover, when the PDCP module discards the PDCP PDU, the TCP may quickly initiate retransmission of the discarded TCP packet. This increases a network rate. In addition, the PDCP module preferentially sends a PDCP PDU corresponding to the to-be-retransmitted TCP packet. This can prevent a problem that congestion at the PDCP layer is aggravated because a new to-be-transmitted TCP packet sent before a to-be-retransmitted TCP packet may trigger fast retransmission.

In the method embodiment shown in FIG. 6A and FIG. 6B, the PDCP module may determine whether a PDCP buffer space is full or whether usage of the PDCP buffer space exceeds a preset threshold. If the buffer space is full or the usage exceeds the preset threshold, a sending stop indication may be sent to the TCP module. For details, refer to the foregoing descriptions of the method implementation shown in FIG. 4A and FIG. 4B. Details are not described herein again.

In the method embodiment shown in FIG. 6A and FIG. 6B, a PDCP PDU may be referred to as a wireless protocol data packet; a "discarded" indication may be referred to as status information of a wireless protocol data packet; and an identifier of the PDCP PDU may be referred to as first characteristic information.

Figure 7A:
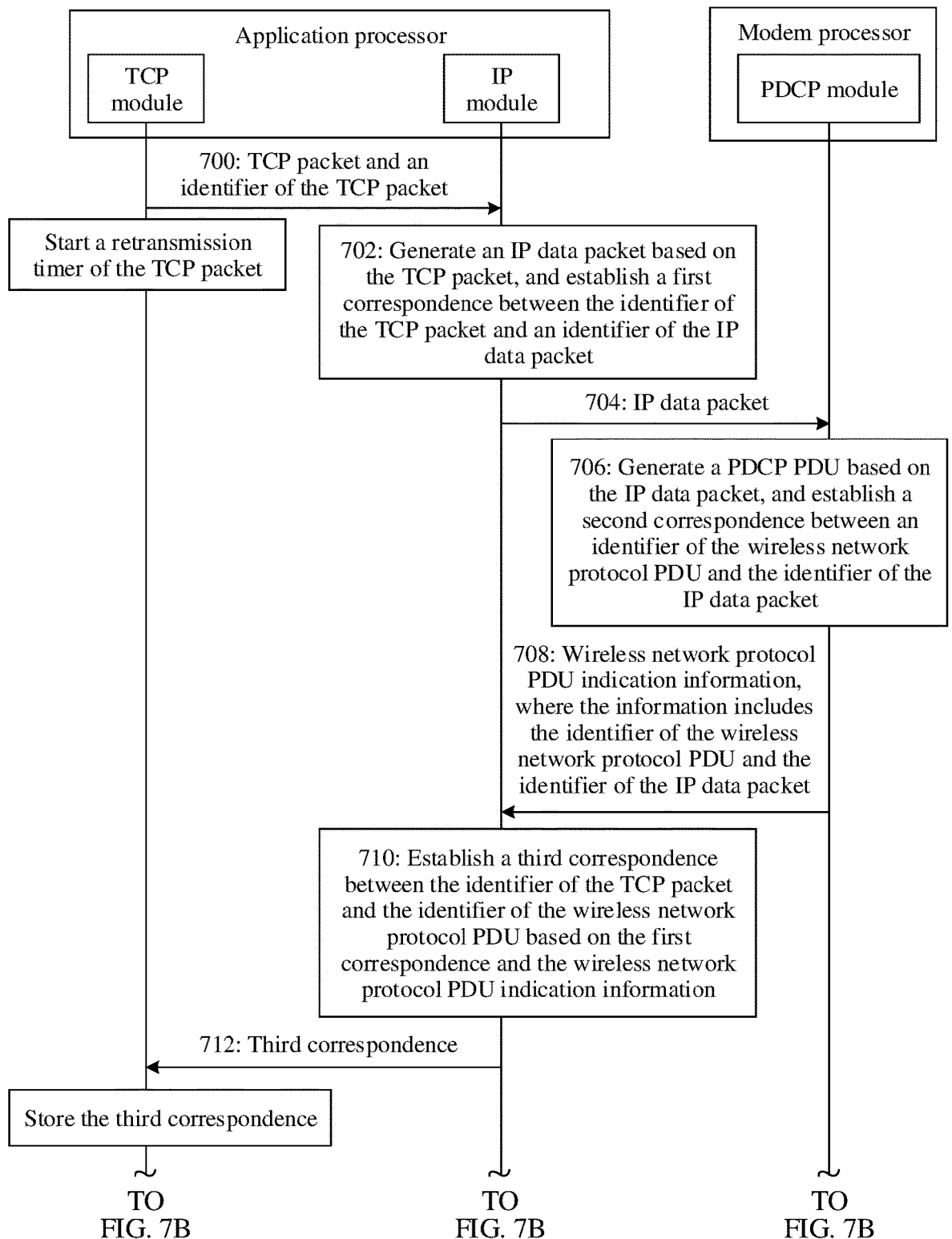
FIG. 7A to FIG. 7C are a flowchart of a data processing method according to an embodiment of this application.
Figure 7B:
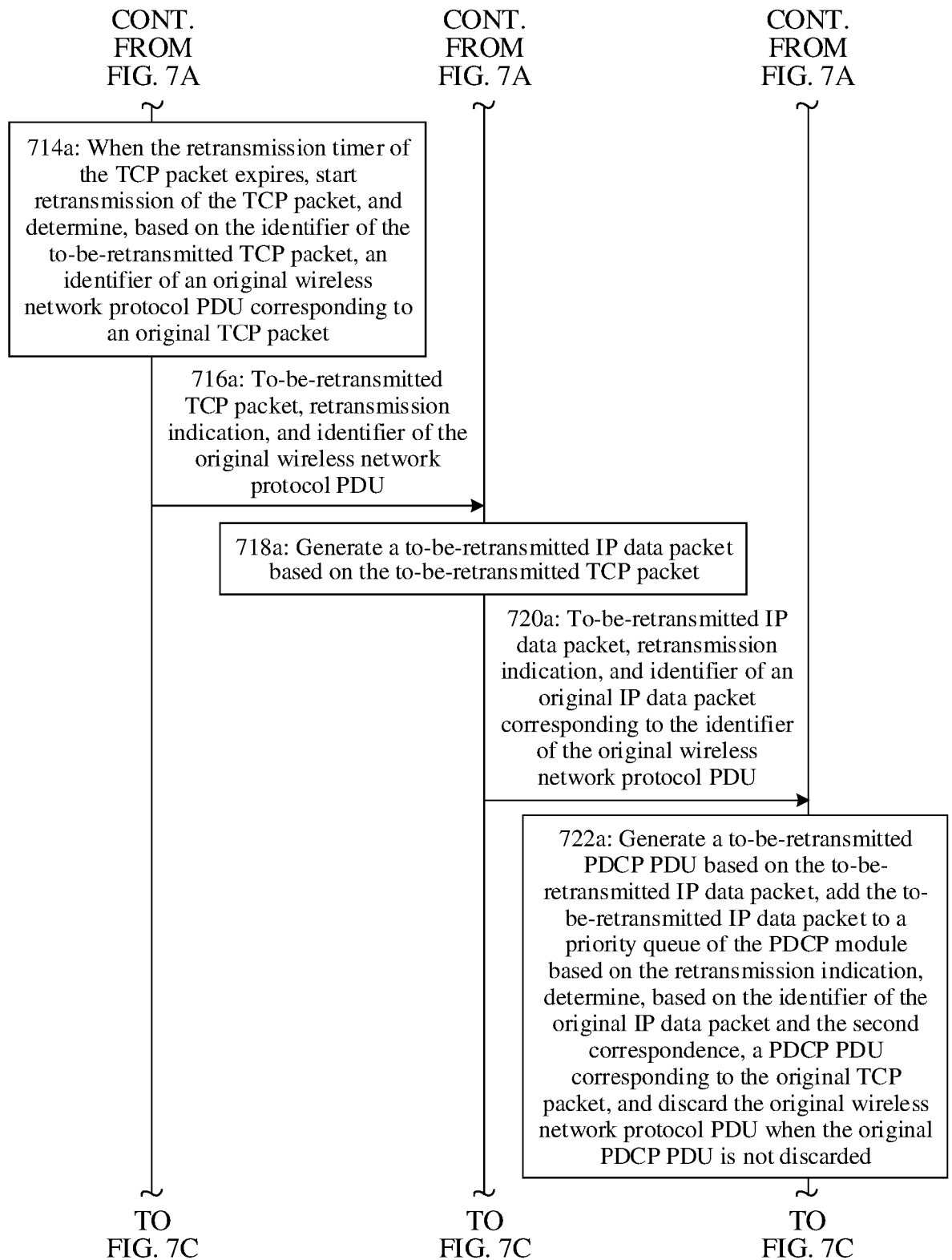
Figure 7C:
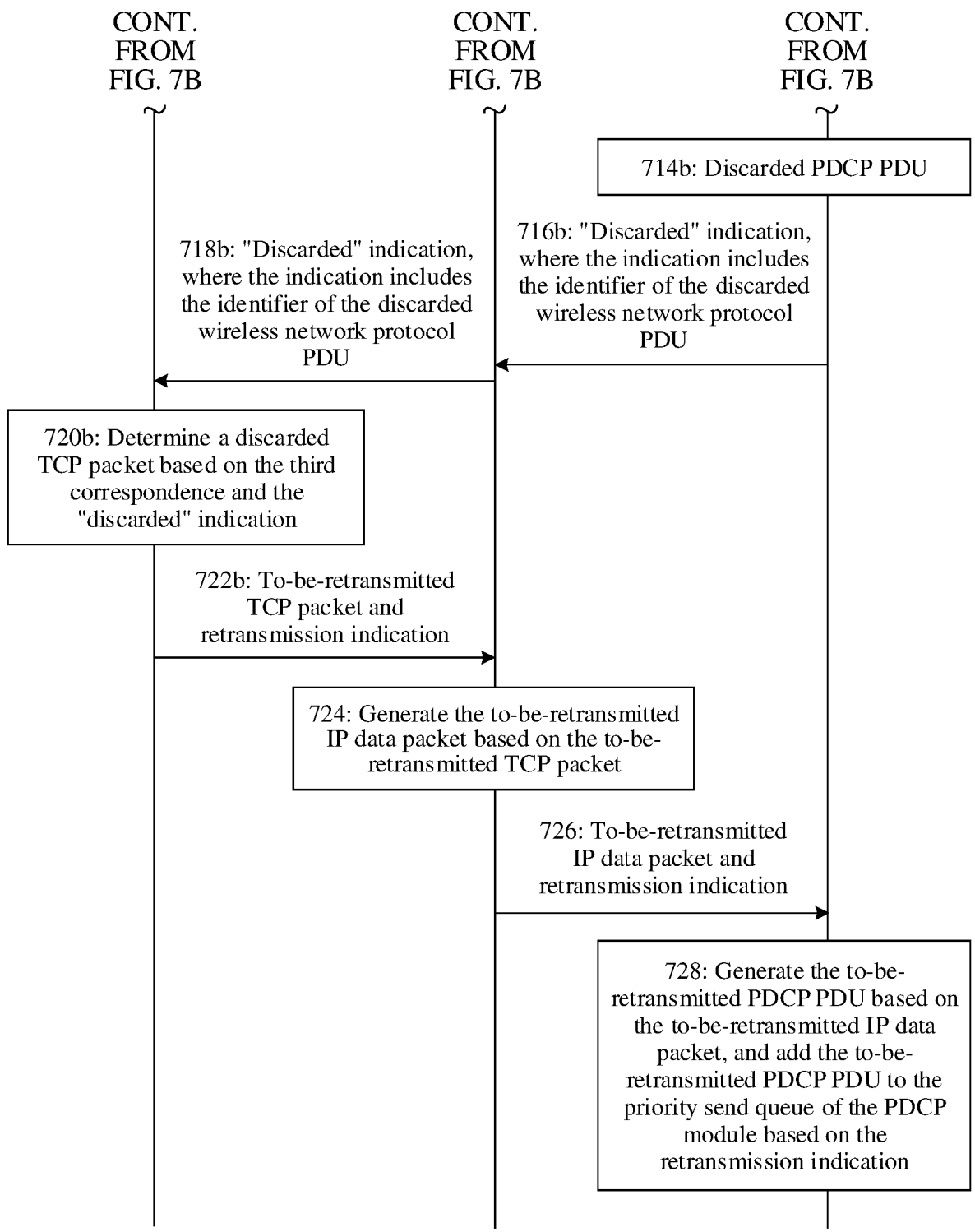

An embodiment of this application provides a data processing method, so that a direct correspondence between a TCP packet and a PDCP PDU can be established. Based on the direct correspondence between a TCP packet and a PDCP PDU, a TCP module and a PDCP module may notify each other of an exception. As shown in FIG. 7A to FIG. 7C, the data processing method provided in this embodiment of this application may include the following steps.

Step 700: The TCP module sends a TCP packet and an identifier of the TCP packet to an IP module.

In step 700, each time the TCP module sends the TCP packet to a lower-layer module of the TCP module, a retransmission timer of the TCP packet is started.

Step 702: Generate an IP data packet based on the TCP packet, and establish a first correspondence between the identifier of the TCP packet and an identifier of the IP data packet.

Step 704: The IP module sends the IP data packet to the PDCP module.

Step 706: The PDCP module generates a PDCP PDU based on the IP data packet, and establishes a second correspondence between an identifier of the PDCP PDU and the identifier of the IP data packet.

Step 708: The PDCP module sends the second correspondence to the IP module.

Step 710: The IP module establishes a third correspondence between the identifier of the TCP packet and the identifier of the PDCP PDU based on the first correspondence and the second correspondence.

Step 712: Send the third correspondence to the TCP module, so that the TCP module stores the third correspondence.

In some embodiments, for any TCP packet, when a retransmission timer of the TCP packet expires, the TCP module may perform step 714*a* to start retransmission of the TCP packet, and determine, based on the first correspondence and an identifier of the TCP packet, an identifier of an original IP data packet corresponding to the original TCP packet.

Step 716a: The TCP module sends the to-be-retransmitted TCP packet, a retransmission indication, and the identifier of the original IP data packet to the IP module.

In some embodiments, in step 716a, the TCP module further sends an identifier of the to-be-retransmitted TCP packet to the IP module.

Step 718a: The IP module generates the to-be-retransmitted IP data packet based on the to-be-retransmitted TCP packet.

In some embodiments, in step 718a, the IP module may establish a first correspondence between the identifier of the to-be-retransmitted TCP packet and the identifier of the to-be-retransmitted IP data packet. In addition, the IP module may send the first correspondence between the identifier of the to-be-retransmitted TCP packet and the identifier of the to-be-retransmitted IP data packet to the TCP module, so that the TCP module replaces the first correspondence between the identifier of the original TCP packet and the identifier of the original IP data packet with the first correspondence between the identifier of the to-be-retransmitted TCP packet and the identifier of the to-be-retransmitted IP data packet.

Step 720a: The IP module sends the to-be-retransmitted IP data packet and the identifier of the original IP data packet to the PDCP module.

In some embodiments, in step 720a, the IP module further sends the identifier of the to-be-retransmitted IP data packet to the PDCP module.

Step 722a: The PDCP module generates a to-be-retransmitted PDCP PDU based on the to-be-retransmitted IP data packet, adds the to-be-retransmitted IP data packet to a priority queue based on the retransmission indication, and determines, based on the identifier of the original IP data packet and the second correspondence, an original PDCP PDU corresponding to the original TCP packet. When the original PDCP PDU is not sent or discarded, the original PDCP PDU may be discarded.

In some embodiments, in step 722a, the PDCP module may establish a second correspondence between the identifier of the to-be-retransmitted IP data packet and the identifier of the to-be-retransmitted PDCP PDU, and replace the second correspondence between the identifier of the original IP data packet and the identifier of the original PDCP PDU with the second correspondence between the identifier of the to-be-retransmitted IP data packet and the identifier of the to-be-retransmitted PDCP PDU.

In this embodiment, when the to-be-retransmitted TCP packet is sent to a PDCP layer, if an original PDCP PDU of the TCP packet still exists at the PDCP layer, the original PDCP PDU may be deleted, so that congestion at the PDCP layer can be prevented from being aggravated by a duplicate PDCP PDU.

When the PDCP module discards any PDCP PDU, the PDCP module may perform step 714b to determine the identifier of the IP data packet based on an identifier of the discarded PDCP PDU and the second correspondence.

Step 716b: The PDCP module sends a "discarded" indication to the IP module, where the indication includes the identifier of the IP data packet.

The identifier of the IP data packet is the identifier of the IP data packet corresponding to the PDCP PDU discarded in step 710b. The "discarded" indication is used to indicate that the TCP packet corresponding to the identifier of the IP data packet included in the indication is discarded by the PDCP module.

In some embodiments, the PDCP module may send the "discarded" indication to the TCP module by performing step 718b and step 720b. Step 718b: The IP module sends the "discarded" indication to the TCP module, where the indication includes the identifier of the IP data packet. Step 720b: The TCP module determines the discarded TCP packet based on the first correspondence and the "discarded" indication.

In some embodiments, the PDCP module may directly send the "discarded" indication to the TCP module. In other words, the "discarded" indication is not forwarded by the IP module.

The TCP module may obtain the identifier of the IP data packet from the "discarded" indication, and further determine the discarded TCP packet based on the corresponding first correspondence.

After determining the discarded TCP packet, the TCP module may initiate retransmission of the discarded TCP packet, and further perform step 722b.

Step 722b: The TCP module sends a to-be-retransmitted TCP packet and a retransmission indication for the discarded TCP packet to the IP module.

The TCP module sends the retransmission indication and the to-be-retransmitted TCP packet to the IP module, so that the IP module can identify a correspondence between the retransmission indication and the to-be-retransmitted packet.

Step 724: The IP module generates the to-be-retransmitted IP data packet based on the to-be-retransmitted TCP packet.

Step 726: The IP module sends the to-be-retransmitted IP data packet and the retransmission indication to the PDCP module.

Step 718: The wireless protocol PDCP module generates the to-be-retransmitted PDCP PDU based on the to-be-retransmitted IP data packet, and adds the to-be-retransmitted PDCP PDU to the priority queue based on the retransmission indication.

In this embodiment, after a PDCP PDU corresponding to a TCP packet is discarded at the PDCP layer, a "discarded" indication may be used, so that the TCP module can quickly initiate retransmission of the discarded TCP packet. In addition, a retransmission indication is used, so that the PDCP module preferentially sends the PDCP PDU corresponding to the to-be-retransmitted TCP packet. This can prevent a problem that congestion at the PDCP layer is aggravated because a new to-be-transmitted TCP packet sent before a to-be-retransmitted TCP packet may trigger fast retransmission.

In some examples, in step 722b, the TCP module may further send the identifier of the to-be-retransmitted TCP packet and the to-be-retransmitted TCP packet to the IP module. In step 724, the TCP module may establish the first correspondence between the identifier of the to-be-retransmitted TCP packet and the identifier of the to-be-retransmitted IP data packet. In step 726, the IP module may send the identifier of the to-be-retransmitted IP data packet and the to-be-retransmitted IP data packet to the PDCP module. In step 728, the PDCP module may establish the second correspondence between the identifier of the to-be-retransmitted IP data packet and the identifier of the to-be-retransmitted PDCP PDU. Then, the PDCP module may send the second correspondence corresponding to the to-be-retransmitted TCP packet to the IP module, so that the IP module establishes, based on the second correspondence corresponding to the to-be-retransmitted TCP packet and the first correspondence corresponding to the to-be-retransmitted TCP packet, a third correspondence corresponding to the to-be-retransmitted TCP packet. Then, the IP module may send the third correspondence corresponding to the to-beretransmitted TCP packet to the TCP module, so that the TCP module stores the third correspondence corresponding to the to-be-retransmitted TCP packet. For details, refer to the foregoing descriptions of step 700 to step 712. Details are not described herein again.

In this embodiment, a correspondence between a TCP packet and a PDCP PDU that include same data is established, so that the PDCP module can delete an original PDCP PDU during data retransmission, so that congestion at the PDCP layer is prevented by a duplicate PDCP PDU. Moreover, when the PDCP module discards the PDCP PDU, the TCP may quickly initiate retransmission of the discarded TCP packet. This increases a network rate. In addition, the PDCP module preferentially sends a PDCP PDU corresponding to the to-be-retransmitted TCP packet. This can prevent a problem that congestion at the PDCP layer is aggravated because a new to-be-transmitted TCP packet sent before a to-be-retransmitted TCP packet may trigger fast retransmission.

In the method embodiment shown in FIG. 7A to FIG. 7C, the PDCP module may determine whether a PDCP buffer space is full or whether usage of the PDCP buffer space exceeds a preset threshold. If the buffer space is full or the usage exceeds the preset threshold, a sending stop indication may be sent to the TCP module. For details, refer to the foregoing descriptions of the method implementation shown in FIG. 4A and FIG. 4B. Details are not described herein again.

In the method embodiment shown in FIG. 7A to FIG. 7C, a PDCP PDU may be referred to as a wireless protocol data packet; a "discarded" indication may be referred to as status information of a wireless protocol data packet; and an identifier of the PDCP PDU may be referred to as first characteristic information.

An embodiment of this application provides a method for establishing a correspondence between a TCP packet and a wireless protocol data packet. The method is applied to a terminal. The terminal includes an application processor and a modem. The application processor includes a TCP module and an IP module.

When sending a TCP packet, the TCP module may send an identifier of the TCP packet and the TCP packet to the IP module. After generating an IP data packet based on the TCP packet, the IP module sends the IP data packet and the TCP packet to the modem. The modem generates a wireless protocol data packet based on the IP data packet, and establishes a third correspondence between an identifier of the wireless protocol data packet and the TCP packet.

In some embodiments, the modem may send the third correspondence to the TCP module. The TCP module stores the third correspondence. When the modem sends status information of the wireless protocol data packet to the TCP module, the modem may add the identifier of the wireless protocol data packet to the status information. When receiving the status information, the TCP module may determine the TCP packet based on the identifier of the wireless protocol data packet in the status information and the third correspondence, and further perform corresponding processing on the TCP packet.

In some embodiments, the modem may not send the third correspondence to the TCP module, and the third correspondence is stored only in the modem. When the modem sends the status information of the wireless protocol data packet to the TCP module, the modem determines the TCP packet based on the identifier of the wireless protocol data packet and the third correspondence, and may further add the identifier of the TCP to the status information. When receiving the status information, the TCP module may determine the TCP packet based on the identifier of the TCP packet in the status information, and further perform corresponding processing on the TCP packet.

With development of mobile communications technologies, it is increasingly common for a user to use a terminal such as a mobile phone or a tablet computer to access the internet through a mobile communications network. A data transmission protocol may be a TCP/IP protocol. For example, the user can watch a video by using a video application (such as Huawei Video) installed on the terminal. For example, for Huawei Video, a server device (for example, a server) of Huawei Video may exchange information with the terminal by using the TCP/IP protocol. Specifically, the server device sends video stream data to a base station in a form of a TCP packet through a core network. Then the base station sends the TCP packet to the terminal through an access network. When the terminal receives any TCP packet, the terminal sends an ACK corresponding to the TCP packet to the base station through the access network, and then the base station sends the ACK to the server device through the core network, to notify the server device that the server device has correctly received the TCP packet. In this case, the server device does not retransmit the TCP packet, but sends a TCP packet including new data. Therefore, whether the server device can receive an ACK of a TCP packet in time affects video stream data transmission, and further affects video watching experience of the user.

Figure 8:
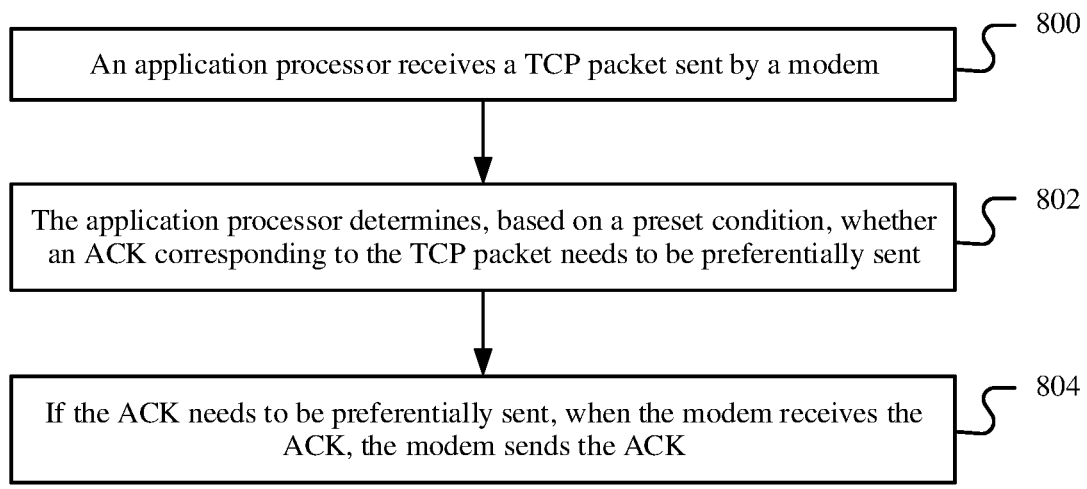
FIG. 8 is a flowchart of a data processing method according to an embodiment of this application.

An embodiment of this application provides a data processing method. The method is applied to a terminal. The terminal includes an application processor and a modem. In this method, TCP ACK information may be preferentially sent, thereby increasing a throughput. As shown in FIG. 8, the data processing method provided in this embodiment of this application may include the following steps.

Step 800: The application processor receives a TCP packet sent by the modem.

Specifically, the modem may receive and parse a wireless protocol data packet corresponding to the TCP packet that is sent by a base station, to obtain an IP data packet corresponding to the TCP packet. Then the modem may send the IP data packet to the application processor. The application processor parses the IP data packet to obtain the TCP packet.

Step 802: The application processor determines, based on a preset condition, whether an ACK corresponding to the TCP packet needs to be preferentially sent.

If the application processor successfully parses the TCP packet, the application processor feeds back the ACK to a source device (for example, a server) of the TCP packet. The application processor may determine whether the TCP packet meets the preset condition, and if the TCP packet meets the preset condition, the TCP packet needs to be preferentially sent. For any TCP packet, a source device of the TCP packet is a device that generates the TCP packet and sends the TCP packet to another device.

In some embodiments, the preset condition is that an application corresponding to the TCP packet is in a foreground working state.

Specifically, the application processor may determine the application corresponding to the TCP packet, and further determine whether a current state of the application is in a foreground working state. For any application, a foreground working state of the application specifically means that the application is in a running state, and a running interface of the application is displayed by the terminal.

If the application corresponding to the TCP packet is in a foreground working state, it is determined that the ACK corresponding to the TCP packet needs to be preferentially sent, so that the source device of the TCP packet can receive the ACK in time, and can further send a new to-be-transmitted TCP packet instead of a to-be-retransmitted TCP packet.

In some embodiments, the preset condition is that a TCP connection corresponding to the TCP packet is in a slow start phase.

If the TCP connection corresponding to the TCP packet is in a slow start phase, it is determined that the ACK corresponding to the TCP packet needs to be preferentially sent, so that the source device of the TCP packet can receive the ACK in time. This can quickly increase a sending window of the TCP packet of the source device.

Step 804: If the ACK needs to be preferentially sent, when the modem receives the ACK, the modem sends the ACK.

In some embodiments, the application processor may add, to a priority sending indication, the ACK that needs to be preferentially sent, and send the priority sending indication to the modem. The priority sending indication is used to indicate the modem to preferentially send the ACK in the priority sending indication. When receiving the priority sending indication, the modem parses the priority sending indication, to obtain the ACK in the indication and immediately send the ACK through an air interface.

In some embodiments, the application processor may send, to the modem, the priority sending indication and the ACK that needs to be preferentially sent. The priority sending indication is used to indicate the modem to preferentially send the ACK. When the modem receives the priority sending indication and the ACK, the modem immediately sends the ACK.

It should be noted that the priority sending indication may be an immediate sending indication, or may be a highest-priority sending indication, or the like. A specific implementation form of the priority sending indication is not limited in this embodiment of this application. Any information used by the modem to preferentially send the TCP packet falls within an included range of the priority sending indication in this embodiment of this application.

In some embodiments, the modem includes a PDCP module, the PDCP module includes a priority send queue and a normal send queue, and a sending priority of a PDCP data packet in the priority send queue is higher than that of a PDCP data packet in the normal send queue. That the modem sends the ACK includes: The modem places the ACK at a first position of the priority send queue.

It is easy to understand that the modem receives an ACK and encapsulates the ACK into a wireless protocol data packet. For ease of description, in this embodiment of this application, the wireless protocol data packet obtained by encapsulating the ACK is referred to as an ACK.

When sending data packets (a data packet corresponding to an ACK, a data packet corresponding to a TCP packet, and the like), the modem preferentially sends a data packet in the priority queue. Specifically, the data packets in the priority queue are sequentially sent through the air interface in an order from a first position to a last position of the priority queue. The ACK is placed at the first position of the priority send queue, so that the ACK is sent before another data packet. Therefore, the ACK that needs to be preferentially sent is preferentially sent.

In this embodiment, TCP ACK information of an application in a foreground working state or TCP ACK information of a TCP connection that corresponds to a TCP packet and that is in a TCP slow start state is placed at a highest priority position of a high priority queue of the PDCP. This can accelerate a TCP transmission rate, and prevent a problem of slow TCP transmission.

According to the data processing method provided in this embodiment of this application, an ACK that needs to be preferentially sent may be determined, and then the ACK is preferentially sent. This can accelerate a TCP transmission rate of an application in a foreground working state, quickly increase a TCP packet sending window, and increase a TCP transmission rate.

Figure 9:
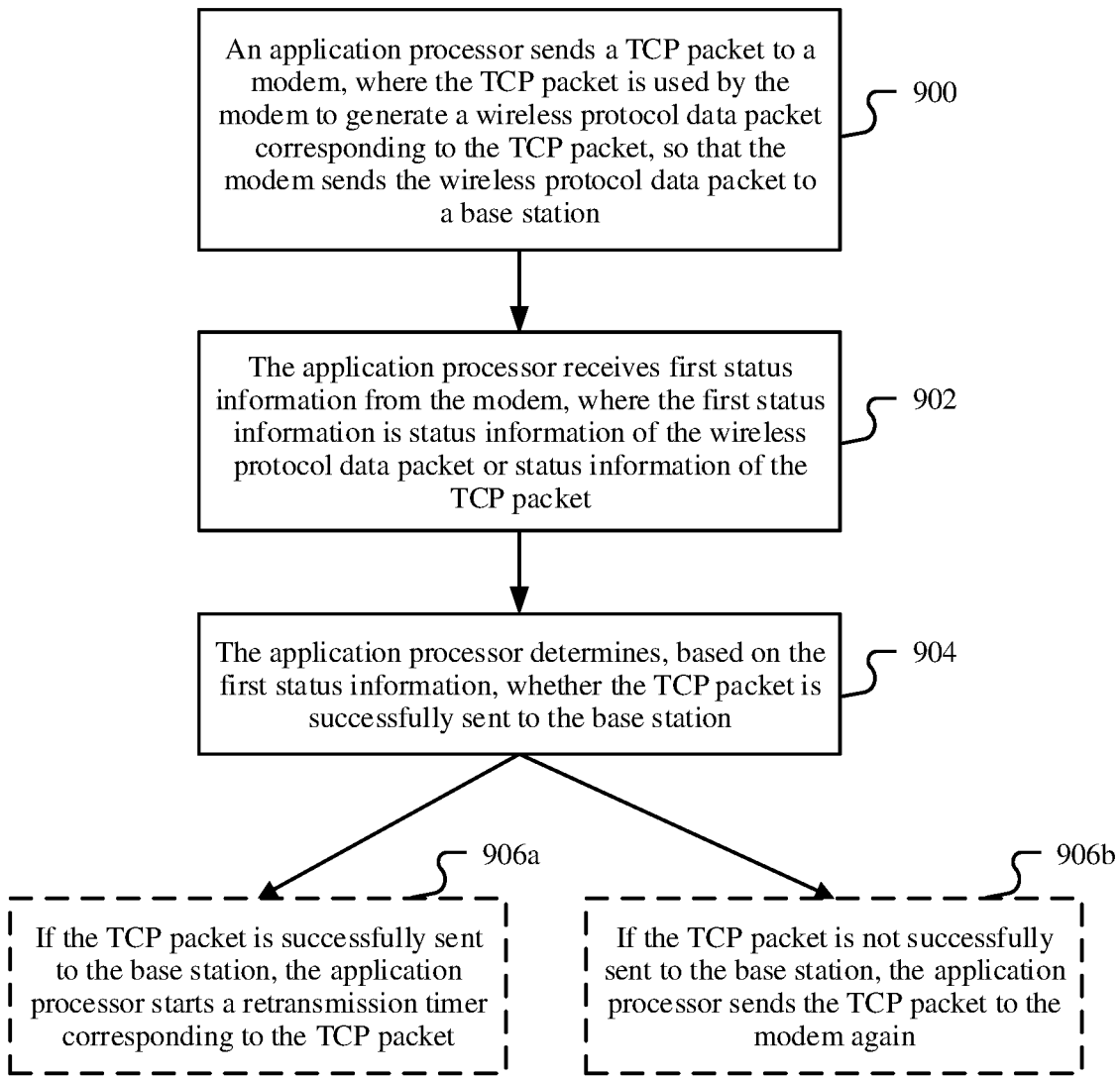
FIG. 9 is a flowchart of a data processing method according to an embodiment of this application.

An embodiment of this application provides a data processing method. The method is applied to a terminal. The terminal includes an application processor and a modem. As shown in FIG. 9, the method includes the following steps.

Step 900: The application processor sends a TCP packet to the modem, where the TCP packet is used by the modem to generate a wireless protocol data packet corresponding to the TCP packet, so that the modem sends the wireless protocol data packet to a base station.

Specifically, step 900 may be implemented with reference to steps 400, 402, 406, and 408 in FIG. 4A and FIG. 4B, or may be implemented with reference to steps 500, 502, 504, and 506 in FIG. 5A and FIG. 5B. Details are not described herein again. Step 902: The application processor receives first status information from the modem, where the first status information is status information of the wireless protocol data packet or status information of the TCP packet.

Step 902: The application processor receives first status information from the modem, where the first status information is status information of the wireless protocol data packet or status information of the TCP packet.

Specifically, step 902 may be implemented with reference to steps 410a, 412a, and 414a in FIG. 4A and FIG. 4B, or may be implemented with reference to steps 410b, 412b, and 414b in FIG. 4A and FIG. 4B, or may be implemented with reference to steps 514a, 516a, and 518a in FIG. 5A and FIG. 5B, or may be implemented with reference to steps 514b, 516b, and 518b in FIG. 5A and FIG. 5B. Details are not described herein again.

Step 904: The application processor determines, based on the first status information, whether the TCP packet is successfully sent to the base station.

Specifically, step 904 may be implemented with reference to step 416a in FIG. 4A and FIG. 4B, or may be implemented with reference to step 416b in FIG. 4A and FIG. 4B, or may be implemented with reference to step 520a in FIG. 5A and FIG. 5B, or may be implemented with reference to step 520b in FIG. 5A and FIG. 5B. Details are not described herein again.

It should be noted that an action performed by the application processor after the TCP packet is successfully sent to the base station or is not successfully sent to the base station is not specifically limited in this embodiment of this application. In this embodiment of this application, the terminal starts a retransmission timer corresponding to the TCP packet when the TCP packet is successfully sent to the base station, and it is not limited or required that the terminal necessarily sends the TCP packet to the modem again when the TCP packet is not successfully sent to the base station. The terminal sends the TCP packet to the modem again when the TCP packet is not successfully sent to the base station, and it is not limited or required that the terminal necessarily starts the retransmission timer corresponding to the TCP packet when the TCP packet is successfully sent to the base station.

In some embodiments, the method further includes: step 906a: If the TCP packet is successfully sent to the base station, the application processor starts the retransmission timer corresponding to the TCP packet.

Specifically, step 906a may be implemented with reference to step 416a in FIG. 4A and FIG. 4B, or may be implemented with reference to step 520a in FIG. 5A and FIG. 5B. Details are not described herein again.

In some embodiments, the method further includes: step 906b: If the TCP packet is not successfully sent to the base station, the application processor sends the TCP packet to the modem again.

Specifically, step 906b may be implemented with reference to steps 416b, 418, 420, and 422 in FIG. 4A and FIG. 4B, or may be implemented with reference to steps 520b, 522, 524, and 526 in FIG. 5A and FIG. 5B. Details are not described herein again.

In some embodiments, the method may further include both steps 906a and 906b.

In some embodiments, the status information of the TCP packet includes first characteristic information. That the application processor determines, based on the first status information, whether the TCP packet is successfully sent to the base station includes: The application processor determines, based on the first characteristic information, a TCP packet corresponding to the first status information.

Specifically, these embodiments may be implemented with reference to step 416a or 416b in FIG. 4A and FIG. 4B, or may be implemented with reference to step 520a or 520b in FIG. 5A and FIG. 5B. Details are not described herein again.

In first examples of these embodiments, the application processor includes a TCP module and an IP module. That the application processor sends a TCP packet to the modem includes: The IP module receives an identifier of the TCP packet from the TCP module, so as to establish a first correspondence between the identifier of the TCP packet and an identifier of an IP data packet corresponding to the TCP packet; and the IP module sends the IP data packet to the modem, so that the modem obtains the identifier of the IP data packet from the IP data packet, and establishes a second correspondence between the identifier of the IP data packet and an identifier of the wireless protocol data packet. The first correspondence and the second correspondence are used to indicate a correspondence between the TCP packet and the wireless protocol data packet.

Specifically, the examples may be implemented with reference to steps 400, 402, 406, and 408 in FIG. 4A and FIG. 4B, or may be implemented with reference to steps 500, 502, 504, and 506 in FIG. 5A and FIG. 5B. Details are not described herein again.

In an example of the first examples, the method further includes: The IP module sends the first correspondence to the TCP module. The first correspondence is used by the TCP module to determine, based on the first characteristic information, the TCP packet corresponding to the first status information, and the first characteristic information is the identifier of the IP data packet that is determined by the modem based on the second correspondence and the identifier of the wireless protocol data packet.

Specifically, the example may be implemented with reference to step 404 in FIG. 4A and FIG. 4B. Details are not described herein again.

In another example of the first examples, the method further includes: The IP module receives the second correspondence from the modem; the IP module establishes a third correspondence between the identifier of the TCP packet and the identifier of the wireless protocol data packet based on the first correspondence and the second correspondence; and the IP module sends the third correspondence to the TCP module. The third correspondence is used by the TCP module to determine, based on the first characteristic information, the TCP packet corresponding to the first status information, and the first characteristic information is the identifier of the wireless protocol data packet.

Specifically, the example may be implemented with reference to steps 508, 510, and 512 in FIG. 5A and FIG. 5B. Details are not described herein again.

In a second example of these embodiments, the application processor includes a TCP module and an IP module. That the application processor sends a TCP packet to the modem includes: The IP module receives the TCP packet and an identifier of the TCP packet from the TCP module; and the IP module sends an IP data packet corresponding to the TCP packet and the identifier of the TCP packet to the modem, so that the modem establishes a third correspondence between the identifier of the TCP packet and an identifier of the wireless protocol data packet, and sends the third correspondence to the TCP module. The third correspondence is used by the TCP module to determine, based on the first characteristic information, the TCP packet corresponding to the first status information, and the first characteristic information is the identifier of the wireless protocol data packet.

In this example, the modem may obtain the identifier of the TCP packet, establish the third correspondence between the identifier of the TCP packet and the identifier of the wireless protocol data packet, and send the third correspondence to the TCP module. The TCP module may store the third correspondence. When determining a status of a wireless protocol data packet (a status indicating that the wireless protocol data packet is successfully sent to the base station or not successfully sent to the base station), the modem may use an identifier of the wireless protocol data packet as first characteristic information, and add the first characteristic information to status information of the wireless protocol data packet, to send the status information of the wireless protocol data packet to the TCP module. When receiving the status information of the wireless protocol data packet, the TCP module may determine, based on a third correspondence and the identifier of the wireless protocol data packet in the status information of the wireless protocol data packet, a TCP packet corresponding to the status information of the wireless protocol data packet.

In a third example of these embodiments, the application processor includes a TCP module and an IP module. That the application processor sends a TCP packet to the modem includes: The IP module receives the TCP packet and an identifier of the TCP packet from the TCP module; and the IP module sends an IP data packet corresponding to the TCP packet and the identifier of the TCP packet to the modem, so that the modem establishes a third correspondence between the identifier of the TCP packet and an identifier of the wireless protocol data packet. The third correspondence is used by the modem to determine the identifier of the TCP packet based on the identifier of the wireless protocol data packet and use the identifier of the TCP packet as the first characteristic information.

In this example, the modem may obtain the identifier of the TCP packet, and establish the third correspondence between the identifier of the TCP packet and the identifier of the wireless protocol data packet. When determining a status of a wireless protocol data packet (a status indicating that the wireless protocol data packet is successfully sent to the base station or not successfully sent to the base station), the modem may determine, based on an identifier of the wireless protocol data packet and a third correspondence, an identifier of a TCP packet corresponding to the wireless protocol data packet, use the determined identifier of the TCP packet as first characteristic information, and add the first characteristic information to status information of the TCP packet, to send the status information of the TCP packet to the TCP module. When receiving the status information of the TCP packet, the TCP module may determine, based on the identifier of the TCP packet in the status information of the TCP packet, the TCP packet corresponding to the status information of the TCP packet.

In some embodiments, that the TCP packet is not successfully sent to the base station is specifically: The wireless protocol data packet has been transmitted by the modem through an air interface, and when a discard timer corresponding to the wireless protocol data packet expires, the modem does not receive an ACK corresponding to the wireless protocol data packet from the base station; or when a discard timer corresponding to the wireless protocol data packet expires, the wireless protocol data packet is still not transmitted by the modem through an air interface.

Specifically, these embodiments may be implemented with reference to step 410 in FIG. 4A and FIG. 4B, or may be implemented with reference to step 514 in FIG. 5A and FIG. 5B. Details are not described herein again.

In an example of these embodiments, the modem includes a packet data convergence protocol PDCP module, the PDCP module includes a priority send queue and a normal send queue, and a sending priority of a PDCP data packet in the priority send queue is higher than that of a PDCP data packet in the normal send queue. That the application processor sends the TCP packet to the modem again includes: The application processor sends a to-be-retransmitted packet and a retransmission indication of the TCP packet to the modem. The retransmission indication is used by the modem to add a PDCP data packet corresponding to the to-be-retransmitted packet to the priority send queue.

Specifically, the example may be implemented with reference to steps 418, 420, 422, and 424, or may be implemented with reference to steps 522, 524, and 526 in FIG. 5A and FIG. 5B. Details are not described herein again.

In some embodiments, that the application processor receives first status information from the modem is specifically: The application processor receives the first status information from a wireless protocol module in the modem. The wireless protocol module is one or any combination of the following:

a PDCP module, a radio link control RLC module, and a media access control MAC module.

Specifically, the example may be implemented with reference to step 410a or 410b in FIG. 4A and FIG. 4B, or may be implemented with reference to step 514a or 514b in FIG. 5A and FIG. 5B. Details are not described herein again.

According to the data processing method provided in this embodiment of this application, a data packet correspondence between the application processor and the modem may be established, so that the application processor and the modem can cooperate with each other to perform data transmission. This increases a data transmission rate and alleviates network congestion.

Figure 10:
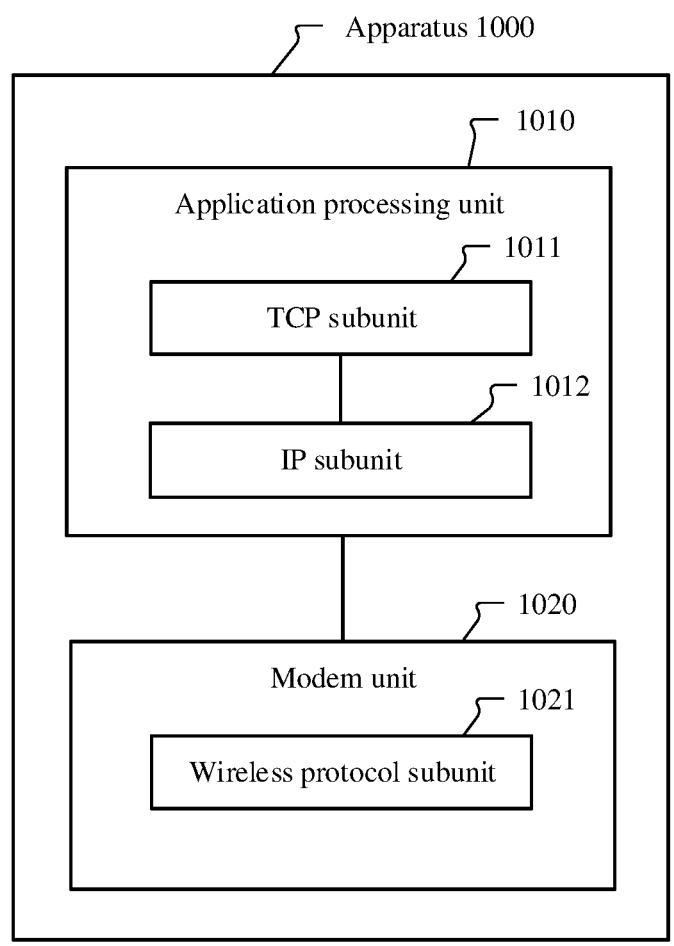
FIG. 10 is a schematic block diagram of a data processing apparatus according to an embodiment of this application.

An embodiment of this application provides a data processing apparatus 1000. As shown in FIG. 10, the apparatus 1000 includes an application processing unit 1010 and a modem unit 1020.

The application processing unit 1010 is configured to send a TCP packet to the modem unit 1020, where the TCP packet is used by the modem unit 1020 to generate a wireless protocol data packet corresponding to the TCP packet, so that the modem unit 1020 sends the wireless protocol data packet to a base station.

The application processing unit 1010 is further configured to receive first status information from the modem unit 1020, where the first status information is status information of the wireless protocol data packet or status information of the TCP packet.

The application processing unit 1010 is further configured to determine, based on the first status information, whether the TCP packet is successfully sent to the base station.

If the TCP packet is successfully sent to the base station, the application processing unit 1010 is further configured to start a retransmission timer corresponding to the TCP packet.

If the TCP packet is not successfully sent to the base station, the application processing unit is further configured to send the TCP packet to the modem unit 1020 again.

In some embodiments, as shown in FIG. 10, the application processing unit 1010 may further include a TCP subunit 1011 and an IP subunit 101.

In one example of these embodiments, the TCP subunit 1011 may perform steps 400, 416a, 416b, 418, and 416c in FIG. 4A and FIG. 4B, and the IP subunit 1012 may perform steps 402, 404, 406, 414a, 414b, 420, 422, and 414c in FIG. 4A and FIG. 4B. Each step in FIG. 4A and FIG. 4B has been described in detail above. Details are not described herein again.

In one example of these embodiments, the TCP subunit 1011 may perform steps 500, 520a, 520b, and 522 in FIG. 5A and FIG. 5B, and the IP subunit 10125 may perform steps 502, 504, 510, 512, 518a, 518b, 514, and 526 in FIG. 5A and FIG. 5B. Each step in FIG. 5A and FIG. 5B has been described in detail above. Details are not described herein again.

In some embodiments, as shown in FIG. 10, the modem unit 1020 may further include a wireless protocol subunit 1021.

In one example of these embodiments, the wireless protocol subunit 1021 may perform steps 408, 410a, 412a, 410b, 424, 410c, and 412c in FIG. 4A and FIG. 4B. Each step in FIG. 4A and FIG. 4B has been described in detail above. Details are not described herein again.

In one example of these embodiments, the wireless protocol subunit 1021 may perform steps 506, 508, 514a, 516a, 514b, 516b, and 528 in FIG. 5A and FIG. 5B. Each step in FIG. 5A and FIG. 5B has been described in detail above. Details are not described herein again.

In some embodiments, the wireless protocol subunit 1021 may be one or any combination of the following:

a PDCP subunit, a radio link control RLC subunit, and a media access control MAC subunit.

The foregoing mainly describes the data processing apparatus provided in this embodiment of this application from the perspective of a method procedure. It may be understood that, to implement the foregoing functions, the terminal includes corresponding hardware structures and/or software modules for performing the functions. A person skilled in the art should be easily aware that units and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In the embodiments of this application, the terminal may be divided into function modules according to the method embodiments shown in FIG. 4A and FIG. 4B, FIG. 5A and FIG. 5B, and FIG. 9. For example, each function module may be obtained through division corresponding to each function, or two or more functions may be integrated into one processing module. The integrated module may be implemented in a form of hardware, or may be implemented in a form of a software function module. It should be noted that division into the modules is an example and is merely logical function division in the embodiments of this application. During actual implementation, another division manner may be used.

According to the data processing apparatus provided in this embodiment of this application, a data packet correspondence between the application processing unit and the modem unit may be established, so that the application processing unit and the modem unit can cooperate with each other to perform data transmission. This increases a data transmission rate and alleviates network congestion.

Figure 11:
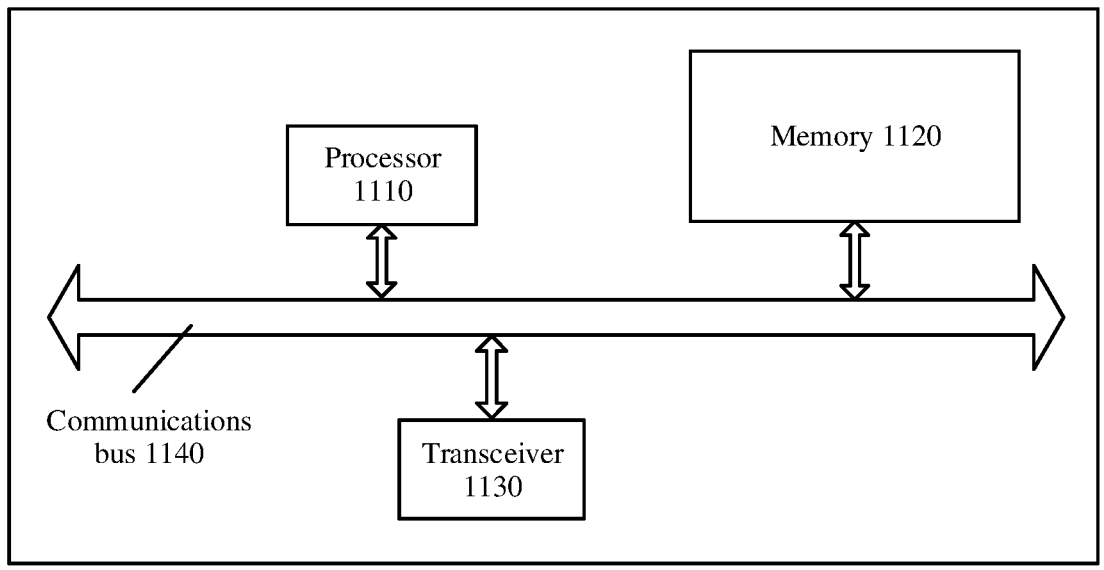
FIG. 11 is a schematic block diagram of a terminal according to an embodiment of this application.

An embodiment of this application provides a terminal. As shown in FIG. 11, the terminal includes a processor 1110, a memory 1120, and a transceiver 1130. The memory 1120 is configured to store computer-executable instructions. When the terminal runs, the processor 1110 executes the computer-executable instructions stored in the memory 1120, so that the terminal performs the method shown in FIG. 9. The processor 1110 includes an application processor and a modem. The application processor is configured to send a TCP packet to the modem, where the TCP packet is used by the modem to generate a wireless protocol data packet corresponding to the TCP packet, so that the modem sends the wireless protocol data packet to a base station. The application processor is further configured to receive first status information from the modem, where the first status information is status information of the wireless protocol data packet or status information of the TCP packet. The application processor is further configured to determine, based on the first status information, whether the TCP packet is successfully sent to the base station. If the TCP packet is successfully sent to the base station, the application processor is further configured to start a retransmission timer corresponding to the TCP packet. If the TCP packet is not successfully sent to the base station, the application processor is further configured to send the TCP packet to the modem again.

In some embodiments, the terminal further includes a communications bus 1140. The processor 1110 may be connected to the memory 1120 and the transceiver 1130 through the communications bus 1140.

Specific implementations of the components/devices of the terminal in this embodiment of this application may be implemented with reference to the method embodiment shown in FIG. 9 above. Details are not described herein again.

Therefore, a data packet correspondence between the application processor and the modem may be established, so that the application processor and the modem can cooperate with each other to perform data transmission. This increases a data transmission rate and alleviates network congestion.

Figure 12:
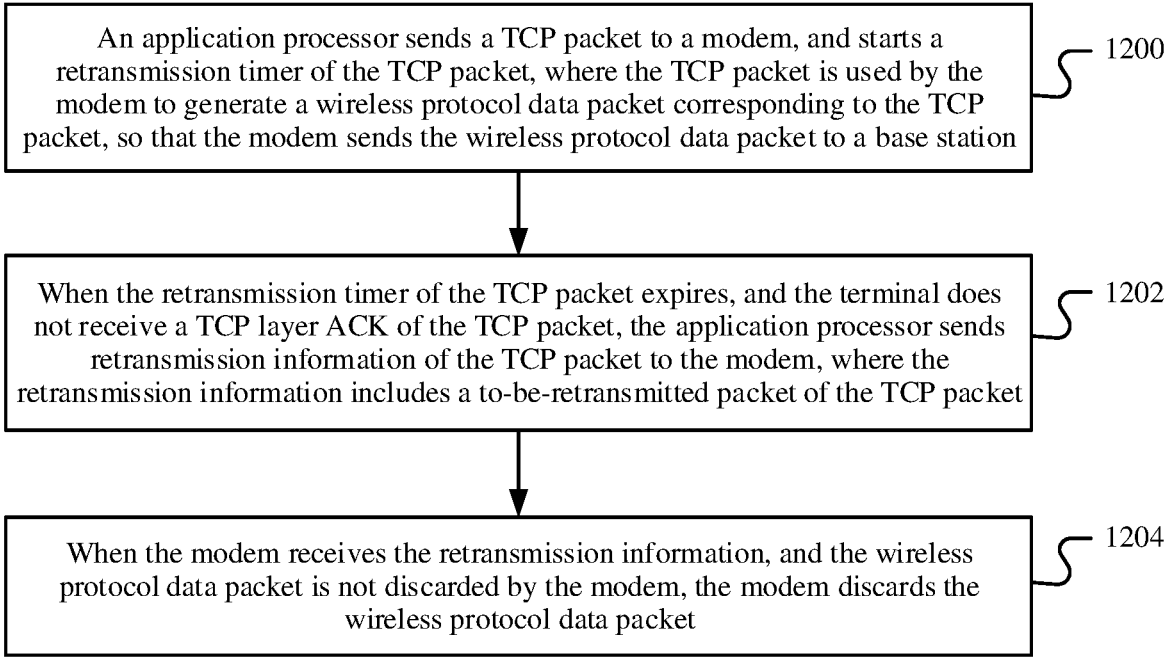
FIG. 12 is a flowchart of a data processing method according to an embodiment of this application.

An embodiment of this application provides a data processing method. The method is applied to a terminal. The terminal includes an application processor and a modem. As shown in FIG. 12, the method includes the following steps.

Step 1200: The application processor sends a TCP packet to the modem, and starts a retransmission timer of the TCP packet, where the TCP packet is used by the modem to generate a wireless protocol data packet corresponding to the TCP packet, so that the modem sends the wireless protocol data packet to a base station.

Specifically, step 1200 may be implemented with reference to steps 600, 602, 606, and 608 in FIG. 6A and FIG. 6B, or may be implemented with reference to steps 700, 702, 704, and 706 in FIG. 7A to FIG. 7C. Details are not described herein again.

Step 1202: When the retransmission timer of the TCP packet expires, and the terminal does not receive a TCP layer ACK of the TCP packet, the application processor sends retransmission information of the TCP packet to the modem, where the retransmission information includes a to-be-retransmitted packet of the TCP packet.

Specifically, step 1202 may be implemented with reference to steps 610*a*, 612*a*, and 614*a* in FIG. 6A and FIG. 6B, or may be implemented with reference to steps 714*a*, 716*a*, 718*a*, and 720*a* in FIG. 7A to FIG. 7C. Details are not described herein again.

Step 1204: When the modem receives the retransmission information, and the wireless protocol data packet is not discarded by the modem, the modem discards the wireless protocol data packet.

Specifically, step 1204 may be implemented with reference to step 618*a* in FIG. 6A and FIG. 6B, or may be implemented with reference to step 722*a* in FIG. 7A to FIG. 7C. Details are not described herein again.

In some embodiments, the modem includes a PDCP module, the wireless protocol data packet is a PDCP data packet, the PDCP module includes a priority send queue and a normal send queue, and a sending priority of a PDCP data packet in the priority send queue is higher than that of a PDCP data packet in the normal send queue. The method further includes: The modem adds a PDCP data packet corresponding to the to-be-retransmitted packet to the priority send queue.

Specifically, these embodiments may be implemented with reference to step 618*a* in FIG. 6A and FIG. 6B, or may be implemented with reference to step 722*a* in FIG. 7A to FIG. 7C. Details are not described herein again.

In some embodiments, the retransmission information further includes first characteristic information, and the first characteristic information is used by the modem to determine a wireless protocol data packet corresponding to the retransmission information.

Specifically, these embodiments may be implemented with reference to step 618*a* in FIG. 6A and FIG. 6B, or may be implemented with reference to step 722*a* in FIG. 7A to FIG. 7C. Details are not described herein again.

In first examples of these embodiments, the application processor includes a TCP module and an IP module. That the application processor sends a TCP packet to the modem includes: The IP module receives an identifier of the TCP packet from the TCP module, so as to establish a first correspondence between the identifier of the TCP packet and an identifier of an IP data packet corresponding to the TCP packet; and the IP module sends the identifier of the IP data packet to the modem, so as to establish a second correspondence between the identifier of the IP data packet and an identifier of the wireless protocol data packet. The first correspondence and the second correspondence are used to indicate a correspondence between the TCP packet and the wireless protocol data packet.

Specifically, these embodiments may be implemented with reference to steps 600, 602, 606, and 608 in FIG. 6A and FIG. 6B, or may be implemented with reference to steps 700, 702, 704, and 706 in FIG. 7A to FIG. 7C. Details are not described herein again.

In one example of the first examples, the method further includes: The IP module sends the first correspondence to the TCP module. The first correspondence is used by the TCP module to determine the identifier of the IP data packet based on the identifier of the TCP packet, to obtain the first characteristic information.

Specifically, the example may be implemented with reference to step 604 in FIG. 6A and FIG. 6B. Details are not described herein again.

In another example of the first examples, the method further includes: The IP module receives the second correspondence from the modem; the IP module establishes a third correspondence between the identifier of the TCP packet and the identifier of the wireless protocol data packet based on the first correspondence and the second correspondence; and the IP module sends the third correspondence to the TCP module. The third correspondence is used by the TCP module to determine the identifier of the wireless protocol data packet based on the TCP packet, to obtain the first characteristic information.

Specifically, the example may be implemented with reference to steps 708, 710, and 712 in FIG. 7A to FIG. 7C. Details are not described herein again.

In a second example of these embodiments, the application processor includes a TCP module and an IP module. That the application processor sends a TCP packet to the modem includes: The IP module receives the TCP packet and an identifier of the TCP packet from the TCP module; and the IP module sends an IP data packet corresponding to the TCP packet and the identifier of the TCP packet to the modem, so that the modem establishes a third correspondence between the identifier of the TCP packet and an identifier of the wireless protocol data packet. The third correspondence is used by the modem to determine, based on the first characteristic information, the wireless protocol data packet corresponding to the retransmission information, and the first characteristic information is the identifier of the TCP packet.

In this example, the modem may obtain the identifier of the TCP packet, and establish the third correspondence between the identifier of the TCP packet and the identifier of the wireless protocol data packet. When a retransmission timer of a specific TCP packet expires, the TCP module may use an identifier of the TCP packet as the first characteristic information, and add the identifier of the TCP packet to retransmission information, to send the retransmission information to the modem. When receiving the retransmission information, the modem may determine, based on the third correspondence and the identifier of the TCP packet in the retransmission information, a wireless protocol data packet corresponding to the retransmission information.

In some embodiments, the method further includes: When the application processor receives a "discarded" indication corresponding to the TCP packet from the modem, the application processor sends the TCP packet to the modem again. The "discarded" indication is information sent by the modem when the TCP packet is not successfully sent to the base station. That the TCP packet is not successfully sent to the base station is specifically: The wireless protocol data packet has been transmitted by the modem through an air interface, and when a discard timer corresponding to the wireless protocol data packet expires, the modem does not receive an ACK corresponding to the wireless protocol data packet from the base station; or when a discard timer corresponding to the wireless protocol data packet expires, the wireless protocol data packet is still not transmitted by the modem through an air interface.

Specifically, these embodiments may be implemented with reference to steps 610*b*, 612*b*, and 614*b* in FIG. 6A and FIG. 6B, or may be implemented with reference to steps 714*b*, 716*b*, 718*b*, and 720*b* in FIG. 7A to FIG. 7C. Details are not described herein again.

According to the data processing method provided in this embodiment of this application, a data packet correspondence between the application processor and the modem may be established, so that the application processor and the modem can cooperate with each other to perform data transmission. This increases a data transmission rate and alleviates network congestion.

Figure 13:
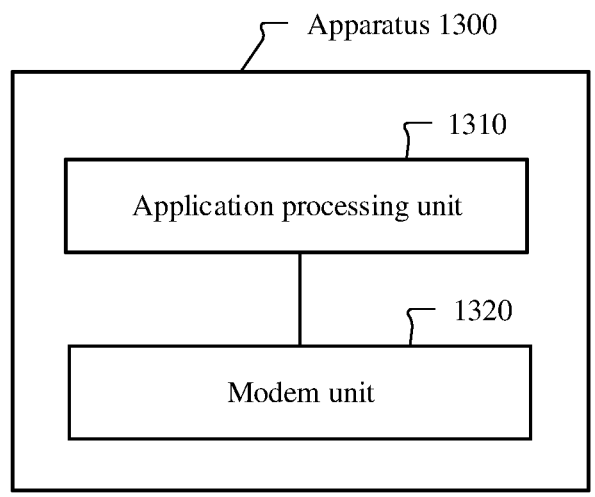
FIG. 13 is a schematic block diagram of a data processing apparatus according to an embodiment of this application.

An embodiment of this application provides a data processing apparatus 1300. As shown in FIG. 13, the apparatus 1300 includes an application processing unit 1310 and a modem unit 1320.

The application processing unit 1310 is configured to send a TCP packet to the modem unit 1320, and start a retransmission timer of the TCP packet, where the TCP packet is used by the modem unit 1320 to generate a wireless protocol data packet corresponding to the TCP packet, so that the modem unit 1320 sends the wireless protocol data packet to a base station.

When the retransmission timer of the TCP packet expires, and the apparatus 1300 does not receive a TCP layer ACK of the TCP packet, the application processing unit 1310 is configured to send retransmission information of the TCP packet to the modem unit 1320, where the retransmission information includes a to-be-retransmitted packet of the TCP packet.

When the modem unit 1320 receives the retransmission information, and the wireless protocol data packet is not discarded by the modem unit 1320, the modem unit 1320 discards the wireless protocol data packet.

The function units of the apparatus 1300 may be implemented with reference to the method embodiment shown in FIG. 6A and FIG. 6B, FIG. 7A to FIG. 7C, or FIG. 12. Details are not described herein again.

The foregoing mainly describes the data processing apparatus provided in this embodiment of this application from the perspective of a method procedure. It may be understood that, to implement the foregoing functions, the terminal includes corresponding hardware structures and/or software modules for performing the functions. A person skilled in the art should be easily aware that units and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In the embodiments of this application, the terminal may be divided into function modules according to the method embodiments shown in FIG. 6A and FIG. 6B, FIG. 7A to FIG. 7C, and FIG. 12. For example, each function module may be obtained through division corresponding to each function, or two or more functions may be integrated into one processing module. The integrated module may be implemented in a form of hardware, or may be implemented in a form of a software function module. It should be noted that division into the modules is an example and is merely logical function division in the embodiments of this application. During actual implementation, another division manner may be used.

According to the data processing apparatus provided in this embodiment of this application, a data packet correspondence between the application processing unit and the modem unit may be established, so that the application processing unit and the modem unit can cooperate with each other to perform data transmission. This increases a data transmission rate and alleviates network congestion.

Figure 14:
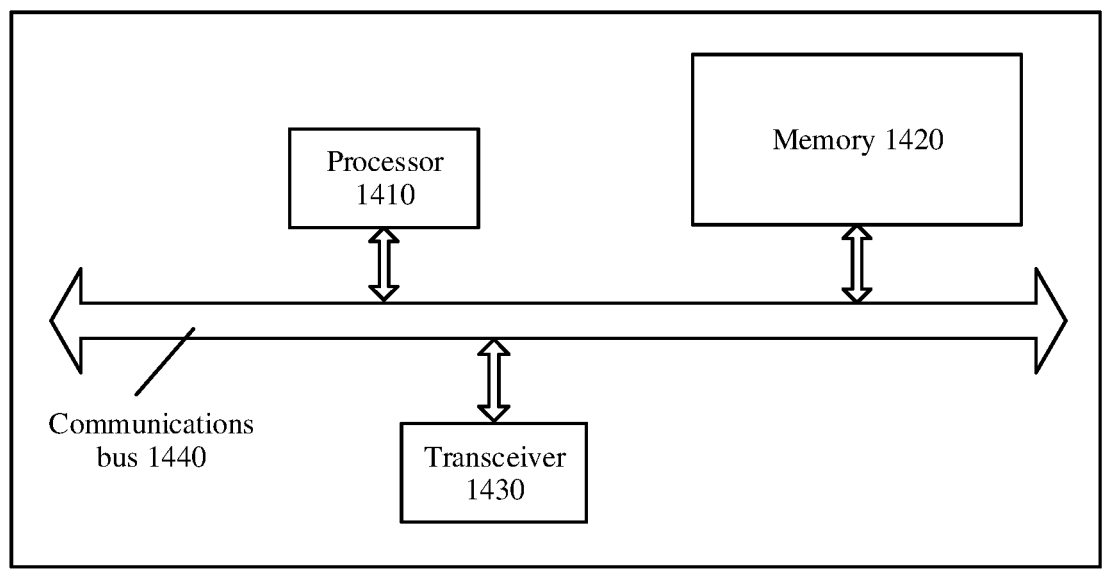
FIG. 14 is a schematic block diagram of a terminal according to an embodiment of this application.

An embodiment of this application provides a terminal. As shown in FIG. 14, the terminal includes a processor 1410, a memory 1420, and a transceiver 1430. The memory 1420 is configured to store computer-executable instructions. When the terminal runs, the processor 1410 executes the computer-executable instructions stored in the memory 1420, so that the terminal performs the method shown in FIG. 12. The processor 1210 includes an application processor and a modem. The application processor is configured to send a TCP packet to the modem, and start a retransmission timer of the TCP packet, where the TCP packet is used by the modem to generate a wireless protocol data packet corresponding to the TCP packet, so that the modem sends the wireless protocol data packet to a base station. When the retransmission timer of the TCP packet expires, and the terminal does not receive a TCP layer ACK of the TCP packet, the application processor is configured to send retransmission information of the TCP packet to the modem, where the retransmission information includes a to-be-retransmitted packet of the TCP packet. When the modem receives the retransmission information, and the wireless protocol data packet is not discarded by the modem, the modem is configured to discard the wireless protocol data packet.

In some embodiments, the terminal further includes a communications bus 1440. The processor 1410 may be connected to the memory 1420 and the transceiver 1430 through the communications bus 1440.

Specific implementations of the components/devices of the terminal in this embodiment of this application may be implemented with reference to the method embodiment shown in FIG. 12 above. Details are not described herein again.

Therefore, a data packet correspondence between the application processor and the modem may be established, so that the application processor and the modem can cooperate with each other to perform data transmission. This increases a data transmission rate and alleviates network congestion.

Figure 15:
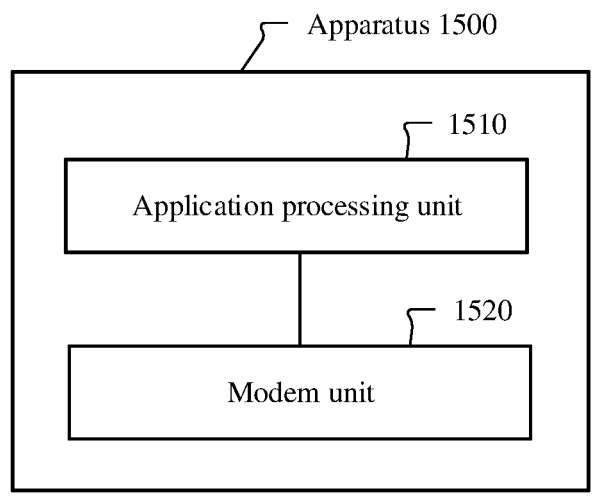
FIG. 15 is a schematic block diagram of a data processing apparatus according to an embodiment of this application.

An embodiment of this application provides a data processing apparatus 1500. As shown in FIG. 15, the apparatus 1500 includes an application processing unit 1510 and a modem unit 1520.

The application processing unit 1510 is configured to receive a TCP packet sent by the modem unit 1520.

The application processing unit 1510 is configured to determine, based on a preset condition, whether an ACK corresponding to the TCP packet needs to be preferentially sent.

If the ACK needs to be preferentially sent, the modem unit 1520 is configured to send the ACK when the modem unit 1520 receives the ACK.

The function units of the apparatus 1500 may be implemented with reference to the method embodiment shown in FIG. 8. Details are not described herein again.

The foregoing mainly describes the data processing apparatus provided in this embodiment of this application from the perspective of a method procedure. It may be understood that, to implement the foregoing functions, the terminal includes corresponding hardware structures and/or software modules for performing the functions. A person skilled in the art should be easily aware that units and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In the embodiments of this application, the terminal may be divided into function modules according to the method embodiment shown in FIG. 8. For example, each function module may be obtained through division corresponding to each function, or two or more functions may be integrated into one processing module. The integrated module may be implemented in a form of hardware, or may be implemented in a form of a software function module. It should be noted that division into the modules is an example and is merely logical function division in the embodiments of this application. During actual implementation, another division manner may be used.

According to the apparatus provided in this embodiment of this application, an ACK that needs to be preferentially sent may be determined, and then the ACK is preferentially sent. This can accelerate a TCP transmission rate of an application in a foreground working state, quickly increase a TCP packet sending window, and increase a TCP transmission rate.

Figure 16:
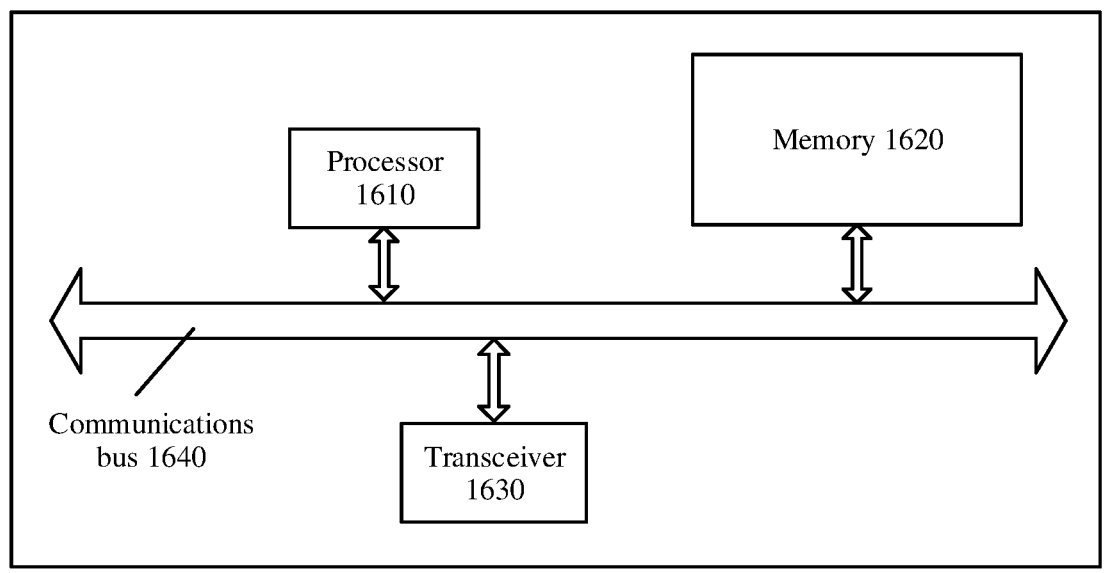
FIG. 16 is a schematic block diagram of a terminal according to an embodiment of this application.

An embodiment of this application provides a terminal. As shown in FIG. 16, the terminal includes a processor 1610, a memory 1620, and a transceiver 1630. The memory 1620 is configured to store computer-executable instructions. When the terminal runs, the processor 1610 executes the computer-executable instructions stored in the memory 1420, so that the terminal performs the method shown in FIG. 8. The processor 1610 includes an application processor and a modem. The application processor is configured to receive a TCP packet sent by the modem. The application processor determines, based on a preset condition, whether an ACK corresponding to the TCP packet needs to be preferentially sent. If the ACK needs to be preferentially sent, the modem sends the ACK when the modem receives the ACK.

In some embodiments, the terminal further includes a communications bus 1640. The processor 1610 may be connected to the memory 1620 and the transceiver 1630 through the communications bus 1640.

Specific implementations of the components/devices of the terminal in this embodiment of this application may be implemented with reference to the method embodiment shown in FIG. 8 above. Details are not described herein again.

Therefore, an ACK that needs to be preferentially sent may be determined, and then the ACK is preferentially sent. This can accelerate a TCP transmission rate of an application in a foreground working state, quickly increase a TCP packet sending window, and increase a TCP transmission rate.

It may be understood that the processor in the embodiments of this application may be a central processing unit (central processing unit, CPU), or may be another general-purpose processor, a digital signal processor (digital signal processor, DSP), an application-specific integrated circuit (application specific integrated circuit, ASIC), a field programmable gate array (field programmable gate array, FPGA) or another programmable logic device, a transistor logic device, a hardware component, or any combination thereof. The general-purpose processor may be a microprocessor or any conventional processor.

The method steps in the embodiments of this application may be implemented in a hardware manner, or may be implemented in a manner of executing software instructions by the processor. The software instructions may include corresponding software modules. The software modules may be stored in a random access memory (random access memory, RAM), a flash memory, a read-only memory (read-only memory, ROM), a programmable read-only memory (programmable rom, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to the processor, so that the processor can read information from the storage medium or write information into the storage medium. Certainly, the storage medium may be a component of the processor. The processor and the storage medium may be located in an ASIC.

All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

It may be understood that various numbers in the embodiments of this application are merely used for ease of distinguishing, and are not used to limit the scope of the embodiments of this application.

What is claimed is:

1. A method, comprising:
sending, by an application processor of a terminal, a transmission control protocol (TCP) packet to a modem of the terminal, wherein the TCP packet is used by the modem to generate a wireless protocol data packet corresponding to the TCP packet, and the modem sends the wireless protocol data packet to a base station, and wherein the application processor implements a TCP module and an IP module, and sending, by the application processor, the TCP packet to the modem comprises:
 receiving, by the IP module, an identifier of the TCP packet from the TCP module, and establishing a first correspondence between the identifier of the TCP packet and an identifier of an IP data packet corresponding to the TCP packet; and
 sending, by the IP module, the IP data packet to the modem, wherein the modem obtains the identifier of the IP data packet from the IP data packet, and establishes a second correspondence between the identifier of the IP data packet and an identifier of the wireless protocol data packet, wherein the first correspondence and the second correspondence indicate a correspondence between the TCP packet and the wireless protocol data packet;
receiving, by the application processor, first status information from the modem, wherein the first status information is status information of the wireless protocol data packet or status information of the TCP packet;
determining, by the application processor based on the first status information, whether the TCP packet is successfully sent to the base station; and
performing the following:
 in response to determining that the TCP packet is successfully sent to the base station, starting, by the application processor, a retransmission timer corresponding to the TCP packet; or
 in response to determining that the TCP packet is not successfully sent to the base station, sending, by the application processor, the TCP packet to the modem again.

2. The method according to claim 1, wherein the status information of the TCP packet comprises first characteristic information; and
wherein determining, by the application processor based on the first status information, whether the TCP packet is successfully sent to the base station comprises:
 determining, by the application processor based on the first characteristic information, a TCP packet corresponding to the first status information.

3. The method according to claim 2, further comprising:
sending, by the IP module, the first correspondence to the TCP module, wherein the first correspondence is used by the TCP module to determine, based on the first characteristic information, the TCP packet corresponding to the first status information, and the first characteristic information is the identifier of the IP data packet that is determined by the modem based on the second correspondence and the identifier of the wireless protocol data packet.

4. The method according to claim 2, further comprising:
receiving, by the IP module, the second correspondence from the modem;

establishing, by the IP module, a third correspondence between the identifier of the TCP packet and the identifier of the wireless protocol data packet based on the first correspondence and the second correspondence; and sending, by the IP module, the third correspondence to the TCP module, wherein the third correspondence is used by the TCP module to determine, based on the first characteristic information, the TCP packet corresponding to the first status information, and the first characteristic information is the identifier of the wireless protocol data packet.

5. The method according to claim 1, wherein that the TCP packet is not successfully sent to the base station comprises that:

the wireless protocol data packet has been transmitted by the modem through an air interface, and when a discard timer corresponding to the wireless protocol data packet expires, the modem has not received an ACK corresponding to the wireless protocol data packet from the base station; or when a discard timer corresponding to the wireless protocol data packet expires, the wireless protocol data packet is still not transmitted by the modem through an air interface.

6. The method according to claim 5, wherein the modem implements a packet data convergence protocol (PDCP) module, the PDCP module comprises a priority send queue and a normal send queue, and a sending priority of a PDCP data packet in the priority send queue is higher than that of a PDCP data packet in the normal send queue; and wherein sending, by the application processor, the TCP packet to the modem again comprises:
sending, by the application processor, a to-be-retransmitted packet and a retransmission indication of the TCP packet to the modem, wherein the retransmission indication is used by the modem to add a PDCP data packet corresponding to the to-be-retransmitted packet to the priority send queue.

7. The method according to claim 1, wherein receiving, by the application processor, the first status information from the modem comprises:

receiving, by the application processor, the first status information from a wireless protocol module in the modem, wherein the wireless protocol module is one or any combination of the following:
a PDCP module, a radio link control (RLC) module, or a media access control (MAC) module.

8. A apparatus, comprising:
an application processor and a modem;
wherein the application processor is configured to:
send a transmission control protocol (TCP) packet to the modem, wherein the TCP packet is used by the modem to generate a wireless protocol data packet corresponding to the TCP packet, and the modem sends the wireless protocol data packet to a base station, wherein the application processor implements a TCP module and an IP module, and wherein the IP module is configured to:
receive an identifier of the TCP packet from the TCP module, and establish a first correspondence between the identifier of the TCP packet and an identifier of an IP data packet corresponding to the TCP packet; and
send the IP data packet to the modem, causing the modem to obtain the identifier of the IP data packet from the IP data packet, and to establish a second correspondence between the identifier of the IP data packet and an identifier of the wireless protocol data packet, wherein the first correspondence and the second correspondence indicate a correspondence between the TCP packet and the wireless protocol data packet;
receive first status information from the modem, wherein the first status information is status information of the wireless protocol data packet or status information of the TCP packet;
determine, based on the first status information, whether the TCP packet is successfully sent to the base station; and
perform the following:
in response to determining the TCP packet is successfully sent to the base station, start a retransmission timer corresponding to the TCP packet; or
in response to determining the TCP packet is not successfully sent to the base station, send the TCP packet to the modem again.

9. The apparatus according to claim 8, wherein the status information of the TCP packet comprises first characteristic information; and wherein the application processor is further configured to determine, based on the first characteristic information, a TCP packet corresponding to the first status information.

10. The apparatus according to claim 9, wherein the IP module is further configured to send the first correspondence to the TCP module, and wherein the first correspondence is used by the TCP module to determine, based on the first characteristic information, the TCP packet corresponding to the first status information, and the first characteristic information is the identifier of the IP data packet that is determined by the modem based on the second correspondence and the identifier of the wireless protocol data packet.

11. The apparatus according to claim 9, wherein the IP module is further configured to:
receive the second correspondence from the modem;
establish a third correspondence between the identifier of the TCP packet and the identifier of the wireless protocol data packet based on the first correspondence and the second correspondence; and
send the third correspondence to the TCP module, wherein the third correspondence is used by the TCP module to determine, based on the first characteristic information, the TCP packet corresponding to the first status information, and the first characteristic information is the identifier of the wireless protocol data packet.

12. The apparatus according to claim 8, wherein that the TCP packet is not successfully sent to the base station comprises:

the wireless protocol data packet has been transmitted by the modem through an air interface, and when a discard timer corresponding to the wireless protocol data packet expires, the modem has not received an ACK corresponding to the wireless protocol data packet from the base station; or when a discard timer corresponding to the wireless protocol data packet expires, the wireless protocol data packet is still not transmitted by the modem through an air interface.

13. The apparatus according to claim 8, wherein the modem implements a packet data convergence protocol (PDCP) module, the PDCP module comprises a priority send queue and a normal send queue, and a sending priority of a PDCP data packet in the priority send queue is higher than that of a PDCP data packet in the normal send queue; and wherein the application processor is configured to send a to-be-retransmitted packet and a retransmission indication of the TCP packet to the modem, wherein the retransmission indication is used by the modem to add a PDCP data packet corresponding to the to-be-retransmitted packet to the priority send queue.

14. A non-transitory computer storage medium, wherein the non-transitory computer storage medium comprises computer instructions, and when the computer instructions are run on a terminal, the terminal is caused to:

send, by an application processor of the terminal, a transmission control protocol (TCP) packet to a modem of the terminal, wherein the TCP packet is used by the modem of the terminal to generate a wireless protocol data packet corresponding to the TCP packet, and the modem sends the wireless protocol data packet to a base station, and wherein the application processor implements a TCP module and an IP module, and sending, by the application processor of the terminal, the TCP packet to the modem comprises:

receiving, by the IP module, an identifier of the TCP packet from the TCP module, and establishing a first correspondence between the identifier of the TCP packet and an identifier of an IP data packet corresponding to the TCP packet; and sending, by the IP module, the IP data packet to the modem, wherein the modem obtains the identifier of the IP data packet from the IP data packet, and establishes a second correspondence between the identifier of the IP data packet and an identifier of the wireless protocol data packet, wherein the first correspondence and the second correspondence indicate a correspondence between the TCP packet and the wireless protocol data packet;

receive, by the application processor, first status information from the modem, wherein the first status information is status information of the wireless protocol data packet or status information of the TCP packet;

determine, by the application processor based on the first status information, whether the TCP packet is successfully sent to the base station; and perform the following:
in response to determining the TCP packet is successfully sent to the base station, starting, by the application processor, a retransmission timer corresponding to the TCP packet; or
in response to determining the TCP packet is not successfully sent to the base station, sending, by the application processor, the TCP packet to the modem again.

\* \* \* \* \*